(12) United States Patent
Takanashi

(10) Patent No.: US 7,092,005 B2
(45) Date of Patent: Aug. 15, 2006

(54) IMAGE POSITION CONFIRMING DEVICE, METHOD OF SUPPORTING IMAGE POSITION CONFIRMATION, AND RECORDING MEDIUM

(75) Inventor: Teruo Takanashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 700 days.

(21) Appl. No.: 09/988,767

(22) Filed: Nov. 20, 2001

(65) Prior Publication Data

US 2002/0060733 A1 May 23, 2002

(30) Foreign Application Priority Data

Nov. 20, 2000 (JP) .............................. 2000-352262

(51) Int. Cl.
H04N 5/253 (2006.01)
H04N 9/47 (2006.01)

(52) U.S. Cl. ...................................................... 348/96

(58) Field of Classification Search ................. 348/96, 348/97, 98, 101, 102, 103, 104, 105, 106; H04N 9/47
See application file for complete search history.

(56) References Cited

U.S. PATENT DOCUMENTS 5,768,516 A * 6/1998 Sugishima ................. 709/217
5,991,010 A * 11/1999 Nishio ......................... 355/82
6,100,960 A * 8/2000 Sato et al. .................... 355/40
6,380,539 B1 * 4/2002 Edgar ..................... 250/339.05
6,462,779 B1 * 10/2002 Philbrick .................... 348/312
6,525,764 B1 * 2/2003 Kondo et al. ................. 348/96

FOREIGN PATENT DOCUMENTS

JP    9-233273    9/1997
JP    10-210225   8/1998

* cited by examiner

Primary Examiner—Nhon Diep
(74) Attorney, Agent, or Firm—Birch, Stewart, Kolasch & Birch, LLP

(57) ABSTRACT

When an image, which is an object of reading and which is recorded on a photographic film, is to be registered at a reading position of a film scanner by an operator, following processes are repeated: results of a CCD sensor picking-up the reading position and periphery thereof are fetched; a moving speed V of the photographic film is computed; if the moving speed V is greater than or equal to a reference value, results of pick-up are displayed on a CRT as a high-speed, monochromatic dynamic image; and if the moving speed is less than the reference value, the results of pick-up are displayed on the CRT as a highly-detailed, color dynamic image. In this way, a dynamic image display mode is automatically switched in accordance with changes in the moving speed v during a registration operation, and registration of the image can be carried out quickly and accurately.

19 Claims, 10 Drawing Sheets

<EXAMPLE OF SWITCHING OF DYNAMIC IMAGE DISPLAY MODE>

■ : PIXEL a
□ : PIXEL b

IMAGE POSITION CONFIRMING DEVICE, METHOD OF SUPPORTING IMAGE POSITION CONFIRMATION, AND RECORDING MEDIUM

BACKGROUND OF THE INVENTION

1. Field of the Invention

The present invention relates to an image position confirming device, a method of supporting image position confirmation, and a recording medium, and in particular, to a method of supporting image position confirmation which supports confirmation of an image position at the time that an image recorded on an original is registered at a predetermined position, and to an image position confirming device to which the method of supporting image position confirmation is applied, and to a recording medium on which is recorded a program for realizing, by a computer, the method of supporting image position confirmation.

2. Description of the Related Art

Conventionally, digital laboratory systems are known which read an image recorded on a photographic film by an image reading device, carry out various types of image processings by image processing devices on the image data obtained by reading, and on the basis of the image data which has been subjected to the image processings, carry out image output processing such as recording the image onto a recording material or writing the image onto an information recording medium such as a CD-R or the like. In such digital laboratory systems, at the time of reading, by the image reading device, an image recorded on a photographic film, the image which is the object of reading must be registered at a reading position of a reading sensor of the image reading device.

The registration of the image which is the object of reading in cases such as when reading for trimming is carried out or reading of a slide film to be set at a slide mount is carried out or the like, is carried out by the operator moving the photographic film manually while visually confirming whether or not the position of the image which is the object of reading is appropriate with respect to the reading position. Further, even in cases in which conveying of a photographic film by a film carrier and registration of an image with the reading position are carried out automatically, there are cases in which the image cannot be accurately registered at the reading position. Thus, the operator visually confirms whether or not the position of the image is appropriate, and if necessary, manually moves the photographic film.

As a technique for assisting registration of an image by an operator, Japanese Patent Application Laid-Open (JP-A) Nos. 9-233273 and 10-210225 disclose, at the time of registration of an image recorded on a film at the reading position, periodically picking-up the state of the periphery of the reading position by a pick-up sensor, and displaying the state as a monochromatic dynamic image on a display. In accordance with this technique, the operator can judge whether or not the current position of the image is appropriate or not by referring to the dynamic image displayed on the display. Thus, there is no longer the need to directly look at the position of the image, and the registration work is easy. Moreover, there is no longer the need to design the layout of the devices at the periphery of the reading position in consideration of the operator directly looking at the image, and the degrees of freedom in designing the device improve.

In a case in which registration of the image is carried out while referring to the dynamic image which is displayed on the display as described above, in consideration of the precision of registration and the speed of the registration operation, it is preferable that the dynamic image displayed on the display is a dynamic image which is extremely detailed and which changes so as to follow, at high speed, changes in the object of pick-up. However, a huge amount of data must be processed in order to display an extremely detailed dynamic image, and thus, the speed of following the changes in the object of pick-up decreases. If priority is given to the speed of following of the dynamic image, if is difficult to display an extremely detailed dynamic image.

Thus, it is currently the state that, in a case in which registration of an image is carried out with reference to a dynamic image which is displayed on a display, the specifications (e.g., the resolution and the like) of the displayed dynamic image are determined such that neither the accuracy of registration nor the speed of the registration work suffers extremely. However, high levels of both accuracy of registration and speed of the registration operation are not achieved.

SUMMARY OF THE INVENTION

The present invention was developed in light of the above-described circumstances, and an object of the present invention is to provide an image position confirming device, a method of supporting (assisting) image position confirmation, and a recording medium in which a dynamic image which is used in registration of an image can be displayed such that an image can be accurately and quickly registered at a predetermined position.

In order to achieve the above object, an image position confirming device relating to a first aspect of the present invention comprises: a pick-up sensor which picks-up a region within a predetermined pick-up range including a predetermined position at which an image, which is recorded on an original, is to be registered (alined); display means for displaying an image; and display control means for, when the image recorded on the original is to be registered at the predetermined position, displaying, as a dynamic image and on the display means and in accordance with a dynamic image display mode selected from among plural types of dynamic image display modes which are readied in advance, results of pick-up which are obtained by the pick-up sensor picking up the region within the predetermined pick-up range.

In an image position confirming device of a second aspect of the invention according to the first aspect of the present invention, the plural types of dynamic image display modes include a high speed display mode which displays the results of pick-up as a dynamic image which follows, at high speed, changes in a state of the region within the predetermined pick-up range, and a highly-detailed display mode which displays the results of pick-up as a dynamic image which shows in great detail a state of the region within the predetermined pick-up range.

In an image position confirming device of a third aspect of the invention according to the second aspect of the present invention, the pick-up sensor outputs the results of pick-up at a predetermined period, and the high speed display mode is a display mode which displays the results of pick-up as a dynamic image by displaying an image which shows the results of pick-up by using, from among data expressing the results of pick-up, only data of one pixel group among a first pixel group and a second pixel group which are determined such that pixels forming each pixel group are substantially uniformly distributed in the region within the pick-up range, and by updating display of the image at the predetermined period, and the highly-detailed display mode is a display mode which displays the results of pick-up as a dynamic image by displaying the results of pick-up by using both data of the first pixel group and data of the second pixel group, and by alternately updating, at the predetermined period, between display corresponding to the first pixel group and display corresponding to the second pixel group.

In an image position confirming device of a fourth aspect of the invention according to the first aspect of the present invention, the plural types of dynamic image display modes include a monochrome display mode which displays the results of pick-up as a monochromatic dynamic image, and a color display mode which displays the results of pick-up as a color dynamic image.

In an image position confirming device of a fifth aspect of the invention according to the first aspect of the present invention, the device further comprises a manual selecting means for manually selecting a dynamic image display mode used in display of the results of pick-up by the pick-up sensor.

In an image position confirming device of a sixth aspect of the invention according to the first aspect of the present invention, the device further comprises an automatic selecting means for, in accordance with a moving state of the original, automatically selecting a dynamic image display mode used in display of the results of pick-up by the pick-up sensor.

In an image position confirming device of a seventh aspect of the invention according to the sixth aspect of the present invention, the device further comprises detecting means for detecting the moving state of the original by carrying out a predetermined computation by using the results of pick-up by the pick-up sensor, wherein the automatic selecting means recognizes the moving state of the original on the basis of results of detection by the detecting means.

In an image position confirming device of an eighth aspect of the invention according to the sixth aspect of the present invention, if the moving state of the original is a state in which a moving speed is greater than or equal to a predetermined value, the automatic selecting means selects, as the dynamic image display mode used in display of the results of pick-up, one of a high speed display mode which displays the results of pick-up as a dynamic image which follows, at high speed, changes in a state of the region within the pick-up range, and a monochrome display mode which displays the results of pick-up as a monochromatic dynamic image, and if the moving state of the original is a state in which the moving speed is less than the predetermined value, the automatic selecting means selects, as the dynamic image display mode used in display of the results of pick-up, one of a highly-detailed display mode which displays the results of pick-up as a dynamic image showing in great detail a state of the region within the pick-up range, and a color display mode which displays the results of pick-up as a color dynamic image.

The image position confirming device relating to the first aspect of the present invention can be applied to, for example, an image reading device which reads an image recorded on an original by illuminating light onto an original and making the light, which is transmitted through or reflected by (an image recorded on) the original, be incident on a pick-up sensor. Or, the image position confirming device can be applied to an image printing device which prints, onto a recording material, an image recorded on an original by irradiating onto a recording material, such as a photographic printing paper or the like, light which is transmitted through or reflected by (the image recorded on) the original.

The invention of the first aspect is provided with a pick-up sensor which picks-up a region within a predetermined pick-up range which includes a predetermined position at which an image, which is recorded on an original, is to be registered, and a display means for displaying an image. A pick-up sensor such as, for example, a CCD or a MOS-type pick-up element or the like can be used as the pick-up sensor. A display such as, for example, a CRT or an LCD or the like, can be used as the display means. Further, the original relating to the present invention may be a transmission-type original such as a photographic film or the like, or may be a reflection-type original such as regular paper or the like.

When the image recorded onto the original is to be registered at the predetermined position, the display control means relating to the invention of the first aspect displays, as a dynamic image and on the display means and in accordance with a dynamic image display mode which is selected from among plural types of dynamic image display modes which are readied in advance, the results of pick-up which are obtained by the pick-up sensor picking up the region within the predetermined pick-up range. In this way, the dynamic image display mode is selected in accordance with the state of registration of the image at the predetermined position or the like, and the dynamic image display mode can be switched appropriately in accordance with changes in the state or the like. Thus, the dynamic image which is used in registering the image can be displayed such that the image is accurately and quickly registered at the predetermined position.

Namely, as in the second aspect of the present invention for example, the plural types of dynamic image display modes can include a high speed display mode which displays the results of pick-up as a dynamic image which follows, at high speed, changes in a state of the region within the predetermined pick-up range, and a highly-detailed display mode which displays the results of pick-up as a dynamic image which shows in great detail a state of the region within the predetermined pick-up range.

As an example, when an image, which is positioned at a position which is relatively far from the reading position, is to be registered so as to roughly coincide with the reading position, the high speed display mode is suitable because the image (original) is moved at a relatively high speed and the state of the region within the pick-up range changes relatively rapidly. In a case in which the high speed display mode is selected, the results of pick-up by the pick-up sensor are displayed on the display means as a dynamic image which follows, at high speed, the changes in the state of the region within the pick-up range. Thus, by referring to the dynamic image displayed on the display means, the operator who is carrying out the registration work can quickly carry out approximate registration of the image at the predetermined position.

On the other hand, the highly-detailed display mode is appropriate when an image, which is positioned at a position near the reading position, is to be accurately registered at the reading position. In a case in which the highly-detailed display mode is selected, the results of pick-up by the pick-up sensor are displayed on the display means as a dynamic image which shows in great detail the state of the region within the pick-up range. Thus, by referring to the dynamic image displayed on the display means, the operator who is carrying out the registration work can register the image accurately at the predetermined position.

The high speed display mode can be realized by making the period of updating the dynamic image shorter, instead of lowering the resolution of or decreasing the number of gradations of the displayed dynamic image. The highly-detailed display mode can be realized by at least one of increasing the resolution of the dynamic image and increasing the number of gradations, instead of lengthening the period of updating the displayed dynamic image.

Further, the realizing of the high speed display mode and the highly-detailed display mode by switching the resolution of the dynamic image can specifically be, for example, as follows as in the third aspect of the present invention. In a case in which the pick-up sensor outputs the results of pick-up at a predetermined period, in the high speed display mode, the results of pick-up are displayed as a dynamic image by displaying an image which shows the results of pick-up by using, from among data expressing the results of pick-up, only data of one pixel group among a first pixel group and a second pixel group which are determined such that pixels forming each pixel group are substantially uniformly distributed in the region within the pick-up range, and by updating display of the image at the predetermined period, and in the highly-detailed display mode, the results of pick-up are displayed as a dynamic image by displaying the results of pick-up by using both data of the first pixel group and data of the second pixel group, and by alternately updating, at the predetermined period, between display corresponding to the first pixel group and display corresponding to the second pixel group.

In the above-described aspect, in the high speed display mode, a dynamic image, which has a resolution of ½ of the resolution of the dynamic image which is displayed in the highly-detailed display mode, is displayed on the display means, and the dynamic image is updated at the predetermined period. In the highly-detailed display mode, a dynamic image, which has a resolution of twice the resolution of the dynamic image displayed in the high speed display mode, is displayed on the display means, and the dynamic image is updated at the predetermined period by using the first pixel group or the second pixel group as a unit (the dynamic image is updated by the first pixel group, the second pixel group being updated at the predetermined period). In this way, the dynamic image is updated at a period which is substantially twice the predetermined period.

As in the fourth aspect of the present invention for example, the plural types of dynamic image display modes may include a monochrome display mode which displays the results of pick-up as a monochromatic dynamic image (for example, black and white dynamic image), and a color display mode which displays the results of pick-up as a color dynamic image. In a monochromatic dynamic image, the amount of data of the image data of one frame of a dynamic image is smaller than that of a color dynamic image, and the updating period of the dynamic image can be made to be shorter. Thus, in the same way as in the above-described high speed display mode, a monochromatic dynamic image is suited to cases in which the state of the region within the pick-up range changes at a relatively high speed. On the other hand, in a color dynamic image, instead of making large the amount of data of the image data of one frame of the dynamic image, a position (e.g., the edge position) of the image which is the object of registration within the dynamic image can be recognized on the basis of the color in the dynamic image in addition to the light-to-dark contrast (color shading) within the dynamic image. Thus, a color dynamic image is suited for cases in which an image, which is positioned at a position near to the reading position, is to be accurately registered at the reading position.

In this way, in accordance with the first aspect of the present invention, at the time when an image recorded on an original is to be registered at a predetermined position, the results of pick-up of the pick-up sensor are displayed as a dynamic image on the display means in accordance with the dynamic image display mode which is selected from among the plural types of dynamic image display modes which are readied in advance. Thus, the dynamic image which is used in registering the image can be displayed such that the image is registered accurately and quickly at the predetermined position.

For the selection of the dynamic image display mode, as in the fifth aspect of the present invention for example, a manual selecting means for manually selecting the dynamic image display mode used in displaying the results of pick-up by the pick-up sensor may be provided, and the operator or the like who is carrying out the image registration work can manually select the dynamic image display mode via the manual selecting means. In this case, the operator or the like who is carrying out the image registration work can arbitrarily select the optimal dynamic image display mode in accordance with the state of registration of the image (e.g., whether there is a state in which an image, which is positioned at a position which is relatively far from the reading position, is to be registered so as to approximately coincide with the reading position, or there is a state in which an image, which is positioned at a position which is near to the reading position, is to be registered accurately at the reading position or the like), or the characteristics of the image which is the object of registration (e.g., whether recognition of the image position is easy even if there is monochrome display with a high light-to-dark contrast, or whether recognition of the image position is difficult with a monochrome display with a low light-to-dark contrast or the like).

Further, as in the sixth aspect of the present invention for example, for the selection of the dynamic image display mode, the dynamic image display mode, which is used in the display of the results of pick-up by the pick-up sensor, may be selected automatically by an automatic selecting means in accordance with a moving state of the original. In this case, there is no need for the operator or the like who is carrying out the image registration work to manually select the dynamic image display mode. Thus, the burden on the operator or the like who is carrying out the image registration work can be lightened.

For the selection of the dynamic image display mode by the automatic selecting means, as in the seventh aspect of the present invention, a detecting means, which detects the moving state of the original by carrying out a predetermined computation by using the results of pick-up by the pick-up sensor, may be provided, and the automatic selecting means can select the dynamic image display mode by recognizing the moving state of the original on the basis of the results of detection by the detecting means. Examples of the predetermined computation for detecting the moving state of the original are as follows. On the basis of plural results of pick-up of the pick-up sensor at respectively different times, a physical amount (a density change amount, changing speed, changing width, or the like), which relates to changes over time in the density at a specific place (a single place or plural places) on the picked-up image expressing the results of pick-up, may be computed. Or, on the basis of the plural results of pick-up, vector analysis can be carried out in which vectors, which express a moving direction and a moving amount (moving speed) of the image which is the object of registration which exists in the picked-up image, are analyzed.

Other than using the results of pick-up by the pick-up sensor as described above for the moving state of the original, for example, in an aspect in which the original is moved in a fixed direction at the time of registration of the image, movement of a specific place on the original (e.g., if the original is a photographic film, a perforation on the photographic film, or the like) may be sensed by a sensor. Or, in an aspect in which a predetermined member is moved integrally with the original at the time of registration of the image, the moving state of the original can be detected by sensing the movement of the predetermined member by a sensor. However, as in the seventh aspect, by using the results of pick-up by the pick-up sensor, the moving state of the original can be detected without providing a special sensor for detecting the moving state of the original.

As in the eighth aspect of the present invention, it is preferable that, in the sixth aspect, if the moving state of the original is a state in which a moving speed is greater than or equal to a predetermined value, the automatic selecting means selects, as the dynamic image display mode used in display of the results of pick-up, one of a high speed display mode which displays the results of pick-up as a dynamic image which follows, at high speed, changes in a state of the region within the pick-up range, and a monochrome display mode which displays the results of pick-up as a monochromatic dynamic image, and if the moving state of the original is a state in which the moving speed is less than the predetermined value, the automatic selecting means selects, as the dynamic image display mode used in display of the results of pick-up, one of a highly-detailed display mode which displays the results of pick-up as a dynamic image showing in great detail a state of the region within the pick-up range, and a color display mode which displays the results of pick-up as a color dynamic image.

In this way, the optimal dynamic image display mode which corresponds to the current moving state of the original can be appropriately and automatically selected. The dynamic image, which is used in registering the image, can be automatically displayed such that the image is registered accurately and quickly at the predetermined position.

A method of supporting image position confirmation of a ninth aspect of the present invention comprises the steps of: providing a pick-up sensor which picks-up a region within a predetermined pick-up range including a predetermined position at which an image, which is recorded on an original, is to be registered; when the image recorded on the original is to be registered (aligned) at the predetermined position, selecting a dynamic image display mode which corresponds to a moving state of the original, from among plural types of dynamic image display modes which are readied in advance; and displaying, as a dynamic image and on a display means for displaying an image and in accordance with a selected dynamic image display mode, results of pick-up obtained by the pick-up sensor picking up the region within the predetermined pick-up range.

Thus, in the same way as in the first aspect, the dynamic image which is used in registering the image can be displayed such that the image is registered accurately and quickly at the predetermined position, and the burden on the operator who is carrying out the registration work can be reduced.

The recording medium relating to the tenth aspect of the present invention is a recording medium on which is recorded a program for executing a predetermined processing at a computer which displays, on a display means for display of an image, results of pick-up which are obtained by a pick-up sensor, which picks-up a region within a predetermined pick-up range including a predetermined position at which an image which is recorded on an original is to be registered (aligned), picking up the region within the predetermined pick-up range, wherein the predetermined processing includes: a first step of, when the image recorded on the original is to be registered at the predetermined position, selecting a dynamic image display mode which corresponds to a moving state of the original, from among plural types of dynamic image display modes which are readied in advance; and a second step of displaying, as a dynamic image and on the display means for displaying an image and in accordance with a selected dynamic image display mode, the results of pick-up obtained by the pick-up sensor picking up the region within the predetermined pick-up range.

On the recording medium of the tenth aspect is recorded a program for realizing, at a computer, processings including the above-described first and second steps, the method of supporting image position confirmation of the ninth aspect. Thus, by a computer reading out and executing the program which is recorded on the recording medium, in the same way as in the ninth aspect, the dynamic image which is used in registering the image can be displayed such that the image is registered accurately and quickly at the predetermined position, and the burden on the operator who is carrying out the registration work can be reduced.

In an image position confirming device of an eleventh aspect of the invention according to the third aspect of the present invention, each pixel of the first pixel group is arranged in a predetermined interval and each pixel of the second pixel group is arranged in a predetermined interval.

In an image position confirming device of a twelfth aspect of the invention according to the eleventh aspect of the present invention, each pixel of the first pixel group and each pixel of the second pixel group are arranged mutually.

In a method of supporting image position confirmation of a thirteenth aspect of the invention according to the ninth aspect of the present invention, the plural types of dynamic image display modes include a high speed display mode which displays the results of pick-up as a dynamic image which follows, at high speed, changes in a state of the region within the predetermined pick-up range, and a highly-detailed display mode which displays the results of pick-up as a dynamic image which shows in great detail a state of the region within the predetermined pick-up range.

In a method of supporting image position confirmation of a fourteenth aspect of the invention according to the thirteenth aspect of the present invention, the pick-up sensor outputs the results of pick-up at a predetermined period, and the high speed display mode is a display mode which displays the results of pick-up as a dynamic image by displaying an image which shows the results of pick-up by using, from among data expressing the results of pick-up, only data of one pixel group among a first pixel group and a second pixel group which are determined such that pixels forming each pixel group are substantially uniformly distributed in the region within the pick-up range, and by updating display of the image at the predetermined period, and the highly-detailed display mode is a display mode which displays the results of pick-up as a dynamic image by displaying the results of pick-up by using both data of the first pixel group and data of the second pixel group, and by alternately updating, at the predetermined period, between display corresponding to the first pixel group and display corresponding to the second pixel group.

In a method of supporting image position confirmation of a fifteenth aspect of the invention according to the ninth aspect of the present invention, the plural types of dynamic image display modes include a monochrome display mode which displays the results of pick-up as a monochromatic dynamic image, and a color display mode which displays the results of pick-up as a color dynamic image.

In a method of supporting image position confirmation of a thirteenth aspect of the invention according to the ninth aspect of the present invention, In a method of supporting image position confirmation of a sixteenth aspect of the invention according to the ninth aspect of the present invention, wherein the moving state of the original is detected by carrying out a predetermined computation by using the results of pick-up by the pick-up sensor, and, on the basis of the detected moving state, the dynamic image display mode is selected, from among the plural types of dynamic image display modes.

In a method of supporting image position confirmation of a seventeenth aspect of the invention according to the ninth aspect of the present invention, when the moving state of the original is a state in which a moving speed is greater than or equal to a predetermined value, as the dynamic image display mode used in display of the results of pick-up, one of a high speed display mode which displays the results of pick-up as a dynamic image which follows, at high speed, changes in a state of the region within the pick-up range, and a monochrome display mode which displays the results of pick-up as a monochromatic dynamic image, is selected, and when the moving state of the original is a state in which the moving speed is less than the predetermined value, as the dynamic image display mode used in display of the results of pick-up, one of a highly-detailed display mode which displays the results of pick-up as a dynamic image showing in great detail a state of the region within the pick-up range, and a color display mode which displays the results of pick-up as a color dynamic image, is selected.

DESCRIPTION OF THE PREFERRED EMBODIMENTS

Embodiments of the present invention will be described hereinafter in detail with reference to the drawings.

FIRST EMBODIMENT

Figure 1:
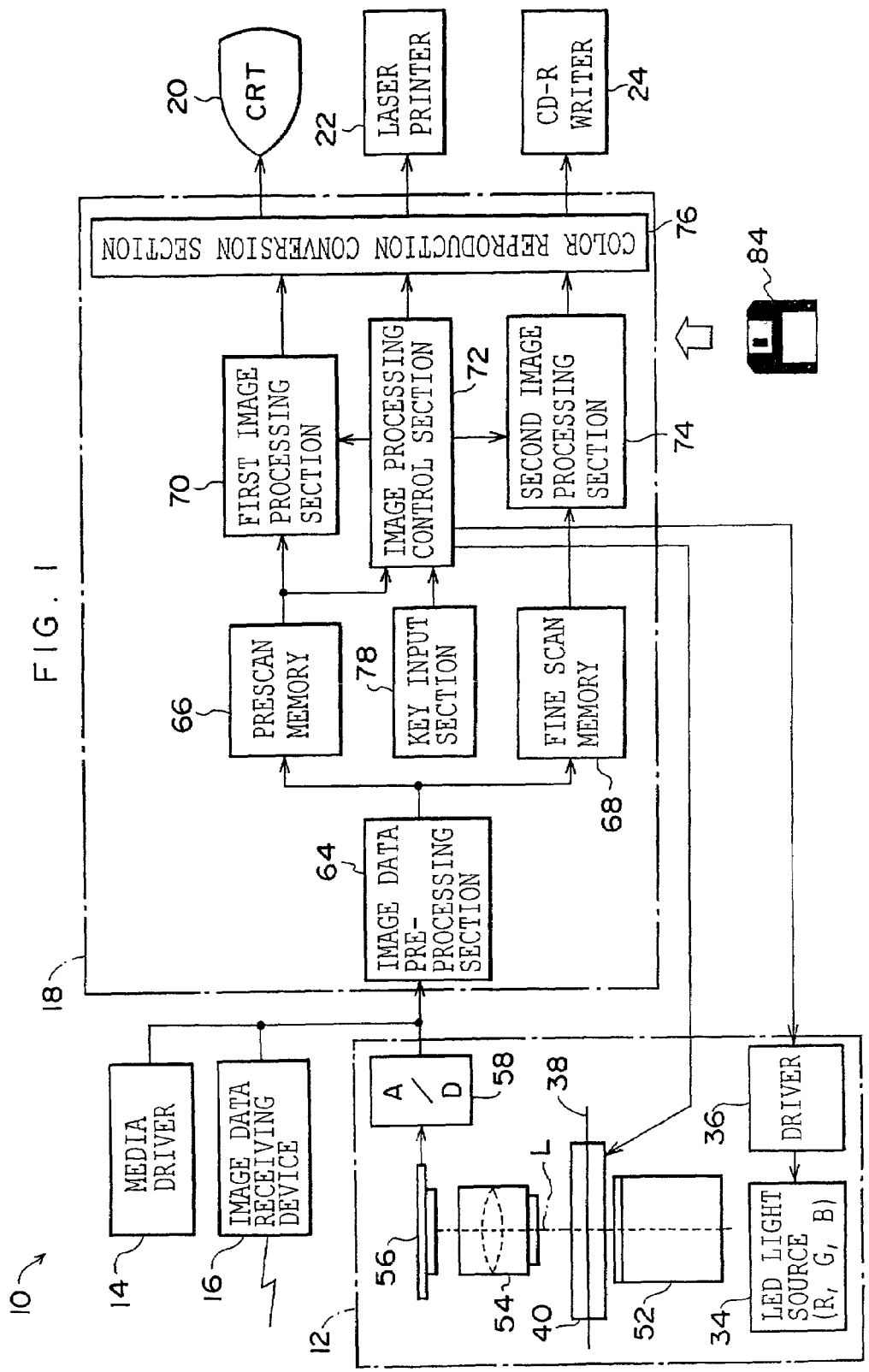
FIG. 1 is a block diagram showing a schematic structure of an image processing system.
Figure 2:
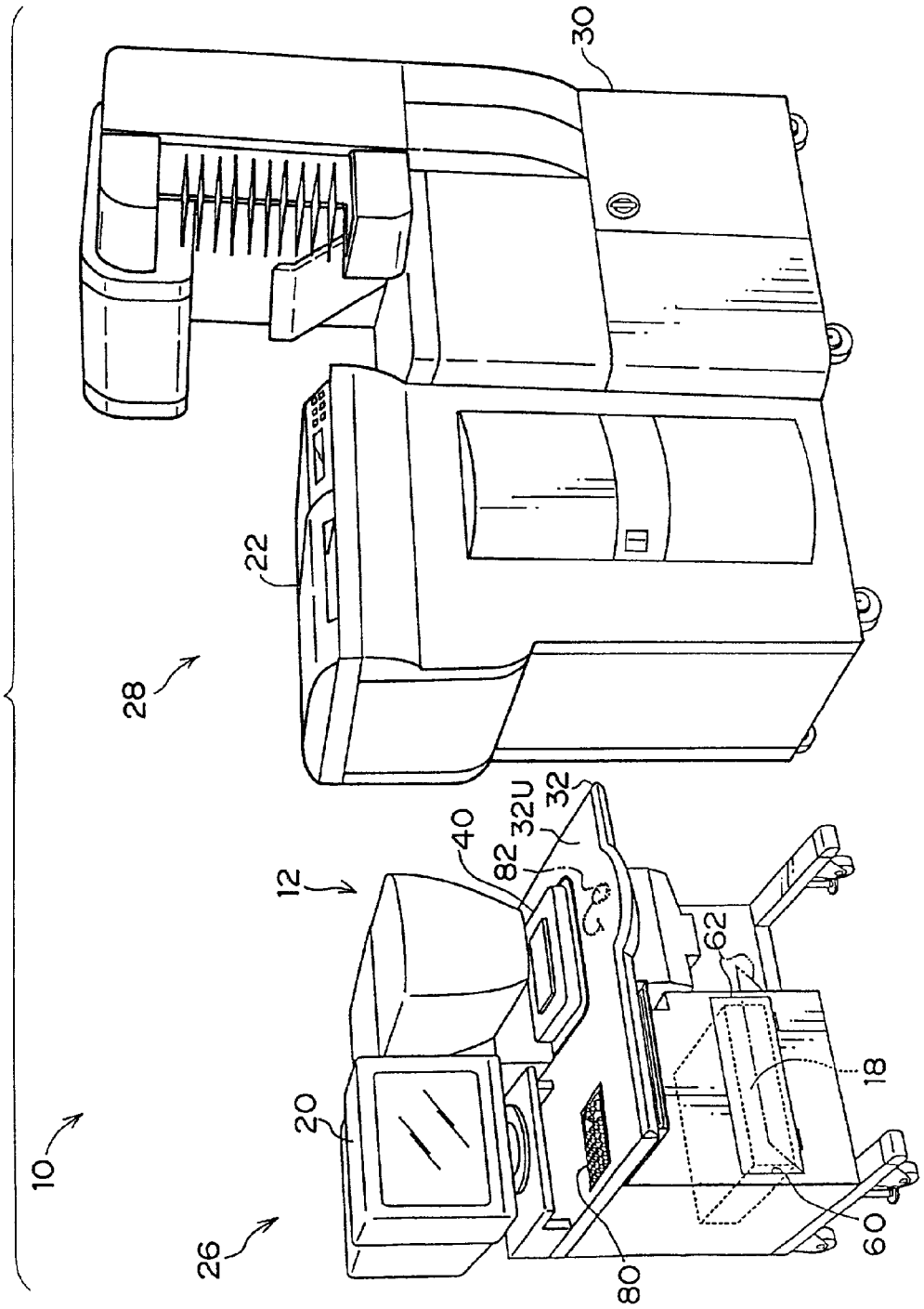
FIG. 2 is a perspective view showing the exterior of the image processing system.

The schematic structure of an image processing system 10 relating to the present embodiment is shown in FIG. 1. The exterior of the image processing system 10 is shown in FIG. 2. As shown in FIG. 1, the image processing system 10 is equipped with, as input devices which input image data, a film scanner 12, a media driver 14, and an image data receiving device 16. The image processing system 10 further has an image processing device 18 which processes image data which is inputted from an input device. In addition, the image processing system 10 has, as output devices which output image data (or an image) which has been subjected to processing by the image processing device 18, a CRT 20 (see FIG. 2 as well) which is for displaying images, a laser printer 22 which exposes and records images onto photographic printing paper, and a CD-R writer 24 which writes image data onto a CD-R.

The film scanner 12 and the image processing device 18 are formed integrally as an input section 26 shown in FIG. 2. The laser printer 22 is formed integrally with a paper processor 30 as an output section 28 shown in FIG. 2. Further, the CRT 20 corresponds to the display means of the present invention. The image position confirming device relating to the present invention is built-into the film scanner 12 and the image processing device 18.

Any of various types of information storing media, for example, a magnetic disk such as a floppy disk (FD), an optical disk such as a CD-R, a magneto-optical disk (MO), a PC card, smart media, or IC card (hereinafter collectively called "digital camera cards") which can be loaded into a digital still camera, and the like, is set in the media driver 14. The image data stored on the set information storing medium is read out and outputted.

The image data receiving device 16 is connected to a computer network such as the internet or the like. The image data receiving device 16 receives R, G, B image data from an information processing device (e.g., a personal computer (PC)) via the computer network, and outputs the received image data.

The film scanner 12 reads a film image (a negative image or positive image which is made visible by undergoing developing processing after being used to photograph a subject) recorded on a photographic photosensitive material (hereinafter simply called "photographic film") such as a photographic film 38 (e.g., a negative film or a reversal film). The film scanner 12 outputs the image data obtained by reading. Film images of, for example, 135 size photographic films, 110 size photographic films, photographic films on which a transparent magnetic layer is formed (240 size photographic films: so-called APS films), and 120 size and 220 size (Brownie size) photographic films can be used as the objects of reading.

As shown in FIG. 2, the film scanner 12 is mounted to a work table 32, and is provided with an LED light source 34 disposed beneath the work table 32. The LED light source 34 is a planar light source formed by a large number of LEDs which emit R light, a large number of LEDs which emit G light and a large number of LEDs which emit B light, being disposed uniformly and at a high density at the entire surface of a substrate which is not shown. The LEDs are driven to emit R light or G light or B light, by a driver 36 which is connected to the LED light source 34.

A film mask 40 or an automatic film carrier (not shown) is selectively placed on a top surface (work surface) 32U of the work table 32 at the portion thereof corresponding to the position at which the LED light source 34 is disposed. The film mask 40 is for registering the image, which is the object of reading and which is recorded on the photographic film 38, manually at a predetermined position (the reading position which corresponds to an optical axis L of reading light emitted from the LED light source 34). The automatic film carrier, while conveying the elongated photographic film 38 along the longitudinal direction thereof, detects the position of the image which is the object of reading, and automatically registers the image which is the object of reading at the reading position.

Figure 3:
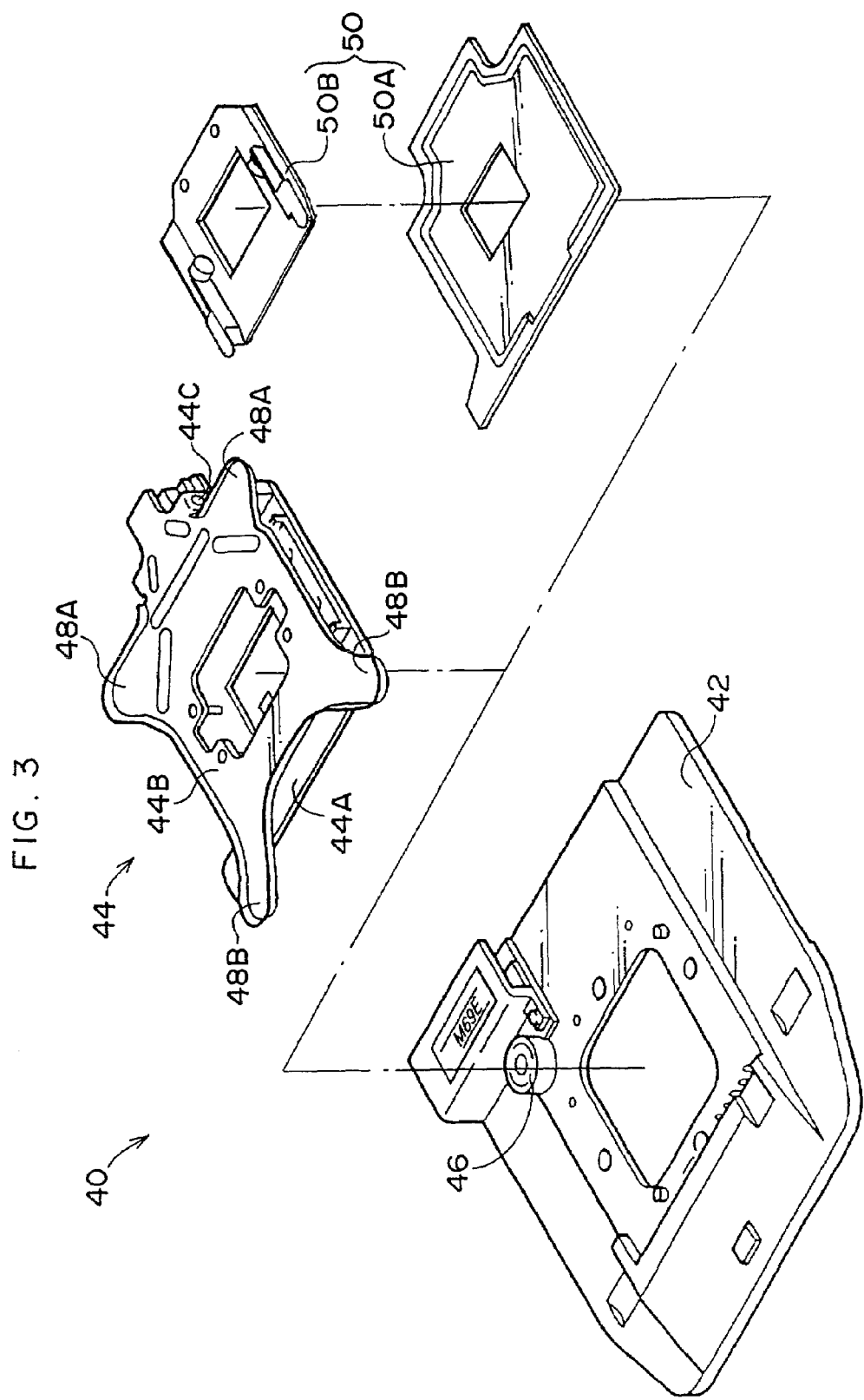
FIG. 3 is an exploded perspective view of a film mask.

As shown in FIG. 3, the film mask 40 is provided with a mask base 42 which is set at a given position on the work surface 32U. A mask 44 for an elongated film or a mask 50 for a mount film is selectively set on the mask base 42. The mask 44 for an elongated film is for manually registering, at the reading position, the image which is the object of reading which is recorded on the elongated photographic film 38. The mask 50 for a mount film is for manually registering, at the reading position, the image which is the object of reading which is recorded on the photographic film 38 which has been cut into units of image frames (e.g., a photographic film which is set at a slide mount, and such a film is called a mount film).

The mask 44 for an elongated film is formed by a base 44A and a cover 44A, which are both substantially square, being connected via a hinge 44C. The cover 44B is rotatable with respect to the base 44A. A square opening, which allows passage of the reading light, is formed in the central portion of each of the base 44A and the cover 44B. Guides are formed in the top surface of the base 44A. The guides guide the both side portions of the photographic film 38 at the time when the elongated photographic film 38 moves along the longitudinal direction thereof between the base 44A and the cover 44B (see FIG. 4).

Figure 4:
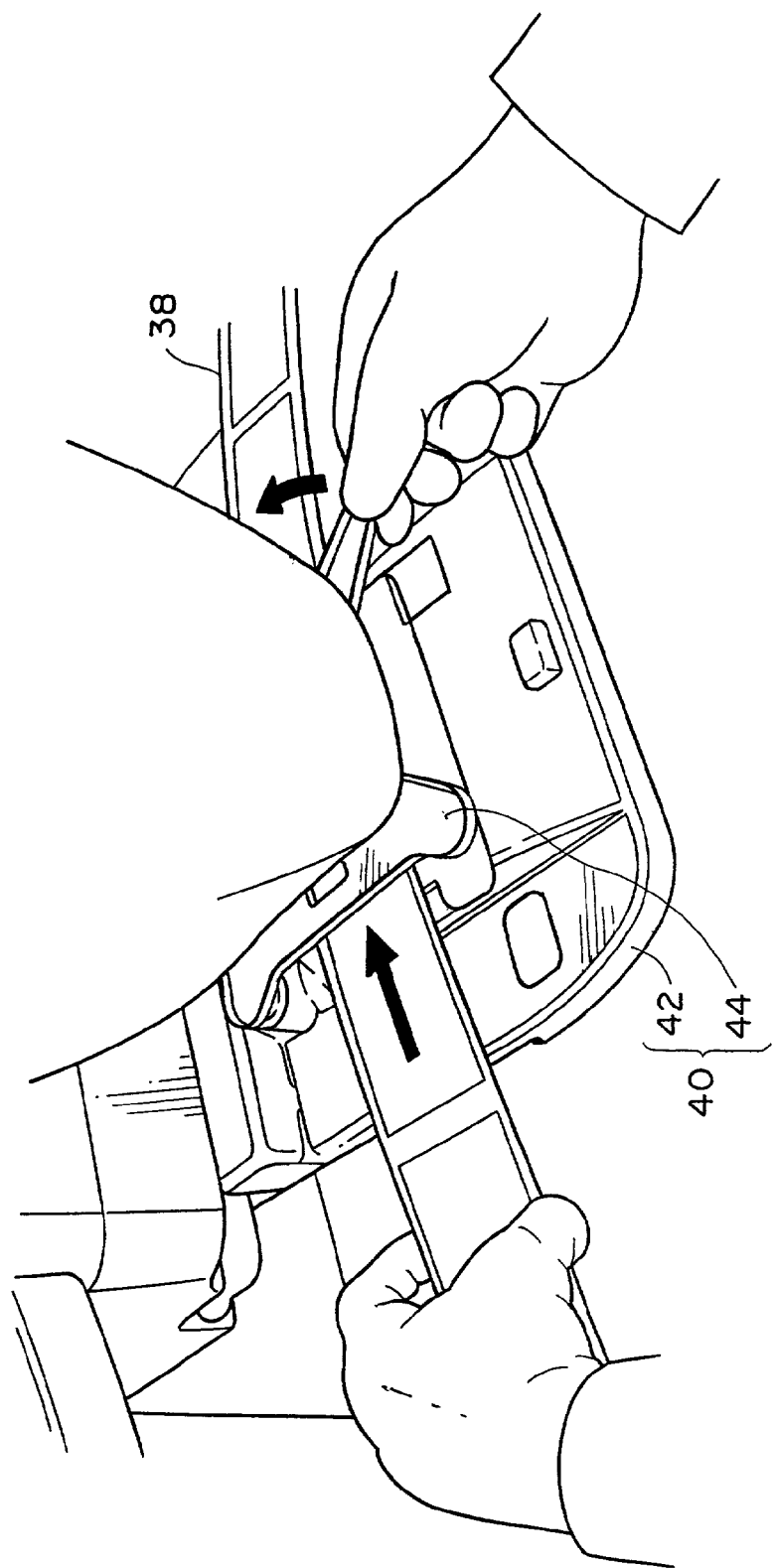
FIG. 4 is a perspective view showing a state in which registration operation of an image is being carried out by using a film mask at which a mask for an elongated film is set.

Tongue plates 48A, which oppose a solenoid 46 provided at the mask base 42 in a state in which the mask 44 for an elongated film is set at the mask base 42, are formed at, among the four corner portions of the cover 44B, the two corner portions which correspond to the both ends of the side which is connected to the base 44A via the hinge 44C. Tongue plates 48B, which are for manually rotating the cover 44B as shown in FIG. 4, are formed at the remaining two corner portions.

The image registration work in a case in which the film mask 40, at which the mask 44 for an elongated film is set, is used is as follows. As shown in FIG. 4, the operator grasps the tongue plate 48B and rotates the cover 44B upward. The operator grasps the elongated photographic film 38, which is inserted between the base 44A and the cover 44B of the mask 44 for an elongated film, and moves the photographic film 38 along the longitudinal direction thereof. When the image registration work is completed, the operator instructs implementation of image reading. In this way, before image reading, the solenoid 46 is energized so as to attract the tongue plate 48A. The photographic film 38, on which the image which is the object of reading is recorded, is nipped (pressed) by a nipping force of a given value or more by the base 44A and the cover 44B, such that the flatness of the photographic film 38 at the time of image reading is ensured.

On the other hand, the mask 50 for a mount film is formed from a flat-plate-shaped base 50A and a film holder 50B for holding the mount film. A square opening, which allows the passage of reading light, is formed in the central portion of each of the base 50A and the film holder 50B. The image registration work in a case in which the film mask 40, at which the mask 50 for a mount film is set, is used is as follows. The operator sets, at the film holder 50B, the photographic film (mount film) 38 on which the image which is the object of reading is recorded. The operator places the film holder 50B on the top surface of the base 50A, and slidingly moves the film holder 50B on the top surface of the base 50A. When the image registration work is completed, the operator instructs implementation of image reading.

Plural types of masks 44 for an elongated film and masks 50 for a mount film are readied in accordance with the various sizes of the photographic films 38. A mask 44 for an elongated film or a mask 50 for a mount film, which corresponds to the size of the photographic film 38 on which the image which is the object of reading is recorded, is selectively set at the mask base 42.

A light diffusing box 52 (see FIG. 1) is disposed between the LED light source 34 and the work table 32. Non-uniformity of the light amount of the light emitted from the LED light source 34 is reduced by the light diffusing box 52, and the light is irradiated onto the photographic film 38 which is set at the film mask 40 or the automatic film carrier. If the image, which is the object of reading and which is recorded on the photographic film 38, is in a state of being registered at the reading position, the light, which has been emitted from the LED light source 34 and has passed through the light diffusing box 52 is, specifically, irradiated onto the image which is registered at the reading position.

As shown in FIG. 1, a lens 54, and an area CCD sensor 56, which serves as the pick-up sensor of the present invention, are disposed in that order above the position at which the film mask 40 or the automatic film carrier is set. The light, which is transmitted through the photographic film 38, is imaged onto the light-receiving surface of the CCD sensor 56 via the lens 54. At the light-receiving surface of the CCD sensor 56, a large number of photoelectric converting cells are aligned in a matrix form. The light which is incident on the light-receiving surface is converted into respective electric signals by the large number of photoelectric converting cells, and is accumulated as charges. The accumulated charges are outputted at fixed periods as pick-up signals expressing the results of picking-up of the region within a predetermined pick-up range which includes the reading position and the periphery thereof. The pick-up signals which are outputted from the CCD sensor 56 are converted into digital image data by an A/D converter 58, and the digital image data is inputted to the image processing device 18.

As shown in FIG. 2, the image processing device 18 is accommodated within an accommodating portion 60 which is formed beneath the work table 32. An opening/closing door 62 is mounted to the opening of the accommodating portion 60. The accommodating portion 60 is usually in a state in which the interior thereof is hid by the opening/closing door 62. When the opening/closing door 62 is rotated, the interior is exposed, and the image processing device 18 can be removed.

The film scanner 12, the media driver 14, and the image data receiving device 16 which were described above are, as shown in FIG. 1, connected to an image data pre-processing section 64 of the image processing device 18. The image data which is outputted from these image data input devices is inputted to the image data pre-processing section 64.

The image data pre-processing section 64 carries out, on the inputted image data, predetermined pre-processings which differ in accordance with the source of the image data input. Examples of pre-processings which are carried out on image data which is inputted from the film scanner 12 are dark correction, density conversion, shading correction, defective pixel correction, and the like. Further, examples of pre-processings which are carried out on image data inputted from the media driver 14 are decompression of image data which is compressed and recorded on an information recording medium, and image processings such as sharpness improvement and the like. Moreover, examples of pre-processings which are carried out on image data which is inputted from the image data receiving device 16 are decompression of compressed image data (e.g., image data in JPEG format) received from the image data receiving device 16, and the like.

Before the image which is the object of reading is registered at the reading position, the film scanner 12 relating to the present embodiment carries out, at fixed period, pick-up (reading) of the region within the predetermined pick-up range at a relatively low resolution (details will be described later). After the image which is the object of reading is registered at the reading position, the film scanner 12 carries out reading twice, each time at a different resolution, for each of the film images recorded on the photographic film. In the first reading which is at a relatively low resolution (hereinafter called "prescanning"), even in cases in which the density of the film image is extremely low (e.g., an underexposed negative image of a negative film), reading can be carried out under the determined reading conditions without problems, such as saturation of the accumulated charges at the reading sensor or the like, occurring.

A prescan memory 66 and a fine scan memory 68 are connected to the image data pre-processing section 64. A first image processing section 70 and an image processing control section 72 are connected to the prescan memory 66. A second image processing section 74 is connected to the fine scan memory 68. The image data pre-processing section 64 carries out a predetermined pre-processing on the low resolution image data, which is inputted at a fixed period from the film scanner 12 by the region within the predetermined pick-up range being picked-up in a state in which the image which is the object of reading is not registered at the reading position. The image data pre-processing section 64 carries out a predetermined pre-processing on the low resolution image data, which is inputted from the film scanner 12 by prescanning being carried out in a state in which the image which is the object of reading is registered at the reading position. Thereafter, the image data pre-processing section 64 outputs the image data, which have been subjected to pre-processing, to the prescan memory 66.

The image data pre-processing section 64 outputs image data inputted from the media driver 14 and image data inputted from the image data receiving device 16 to the prescan memory 66 and the fine scan memory 68. Among these image data, the image data which is outputted to the prescan memory 66 is outputted to the prescan memory 66 after being converted to image data of a low resolution which is equivalent to that of the low resolution image data obtained by prescanning. The low resolution image data outputted to the prescan memory 66 is inputted, via the prescan memory 66, to the image processing control section 72.

The image processing control section 72 and the first image processing section 70 can be realized by a single microcomputer in which the CPU, ROM, RAM, and input/output port are connected to one another via busses and a storage device such as a hard disk device (HDD) or the like is connected to the input/output port. By making the microcomputer execute a predetermined program, the microcomputer can be made to function as each of the first image processing section 70 and the image processing control section 72.

The image processing control section 72 is connected to a driver 36 of the film scanner 12, and is electrically connected to the film mask 40 or the automatic film carrier which is set at the film scanner 12. The image processing control section 72 controls the lighting and turning off of the LED light source 34 via the driver 36, and controls the operation of the film mask 40 or the automatic film carrier which is set at the film scanner 12 (specifically, for example, controls the energization of the solenoid 46 of the film mask 40, or controls the conveying of the photographic film 38 by the automatic film carrier in accordance with a conveying instruction inputted from the operator via a keyboard 80, or the like).

In a case in which the low resolution image data inputted via the prescan memory 66 is image data which has been obtained by prescanning being carried out at the film scanner 12, the image processing control section 72 computes an image characteristic amount, such as density or the like, on the basis of the low resolution data. The image processing control section 72 determines the reading conditions for the time the film scanner 12 reads the photographic film, which has undergone prescanning, again, this time at a relatively high resolution (which will be called "fine scanning" hereinafter). The image processing control section 72 outputs the determined reading conditions to the film scanner 12.

On the basis of the inputted low resolution image data, the image processing control section 72 automatically determines by computation (set-up computation) processing conditions of various types of image processings which are to be carried out by the second image processing section 74 on the high resolution image data of the same image outputted from the image data pre-processing section 64 via the fine scan memory 68 to the second image pre-processing section 74 (the image data inputted from the film scanner 12 by fine scanning, or the image data inputted from the media driver 14, or the image data inputted from the image data receiving device 16). The image processing control section 72 notifies the first image processing section 70 of the determined processing conditions.

Examples of image processings which are carried out at the second image processing section 74 are image processings for improving the image quality of the output image, such as gray balance adjustment of the image, density adjustment, gradation control, hypertone processing which compresses the gradation of the ultra-low frequency brightness components of the image, hypersharpness processing for enhancing the sharpness while suppressing graininess, and the like. Further, image processings such as image processing for intentionally changing the image finish (e.g., image processing for finishing the output image with a portrait finish), or image processing for manipulating the image (e.g., image processing for finishing the image such that a person existing in the original image appears to be thinner in the main image), or the like, can be carried out.

On the basis of the processing conditions notified from the image processing control section 72, the first image processing section 70 subjects the low resolution image data which is stored in the prescan memory 66 to image processing which is equivalent to the image processing which is carried out by the second image processing section 74 on the high resolution image data, such that the first image processing section 70 generates simulation image data. A color reproduction conversion section 76 and a CRT 20 are connected in that order to the first image processing section 70. The CRT 20 is provided with a buffer for holding the inputted image data, and has the functions of generating an analog electrical signal on the basis of the image data held in the buffer, and displaying an image expressed by the image data on the CRT 20. The simulation image data generated at the first image processing section 70 is outputted to the color reproduction conversion section 76. After color reproduction conversion processing, such as density conversion or the like, is carried out by the color reproduction conversion section 76, the data is outputted to the CRT 20 and is displayed on the CRT 20 as a simulation image (output image). The output image displayed on the CRT 20 is provided for verification of the finish of the image by the operator, and the like.

A key input section 78 is connected to the image processing control section 72. As is shown in FIG. 2 for example, the key input section 78 can be formed by a keyboard 80 which is embedded in the work table 32, and a mouse 82 which is placed on the work surface 32U of the work table 32. (The keyboard 80 and the mouse 82 are connected to the input/output port of the microcomputer mentioned above.) The operator, who has verified the output image displayed on the CRT 20, operates the key input section 78 so as to input the results of verification. Then, when the processing conditions have been decided upon through the verification by the operator, the image processing control section 72 notifies the second image processing section 74 of the decided-on processing conditions.

The second image processing section 74 is equipped with a plurality of image processing circuits which carry out the various types of image processings mentioned above. When high resolution image data is inputted from the image data pre-processing section 64 via the fine scan memory 68, the second image processing section 74 subjects the inputted high resolution image data to various types of image processings in accordance with the processing conditions which are notified from the image processing control section 72. The second image processing section 74 is connected to the color reproduction conversion section 76. The image data outputted from the second image processing section 74 is, after being subjected to color reproduction conversion processing at the color reproduction conversion section 76, outputted to the laser printer 22 or the CD-R writer 24, and is either used to record an image onto a photographic printing paper by the laser printer 22 or is written onto a CD-R by the CD-R writer 24.

The laser printer 22 is equipped with R, G, B laser light sources. The R, G, B laser lights emitted from the laser light sources are modulated on the basis of the image data inputted from the image processing device 18, and are deflected by a deflecting means such as a polygon mirror or the like, and are scanned onto a photographic printing paper. In this way, an image is exposed and recorded onto the photographic printing paper. The photographic printing paper onto which an image has been exposed and recorded is sent to the paper processor 30, and is subjected to the various processings of color developing, bleaching fixing, washing and drying. In this way, the image which is exposed and recorded on the photographic printing paper is made visible.

Next, dynamic image display control processing, which is carried out at the image processing control section 72 of the image processing device 18 at the time when the image, which is the object of reading and which is recorded on the photographic film 38, is registered at the reading position and read (specifically, the dynamic image display control processing which is realized by a predetermined program being executed by the microcomputer which functions both as the first image processing section 70 and the image processing control section 72), will be described as the operation of the present first embodiment. Note that the image processing control section 72, which executes the dynamic image display control processing, corresponds to the display control means of the present invention.

The dynamic image display control processing is a processing to which is applied the image position confirmation supporting method relating to the present invention. (The same holds for the dynamic image display control processing which will be described in the second embodiment hereinafter.) Specifically, the dynamic image display control processing is realized by the CPU of the microcomputer, which functions as both the first image processing section 70 and the image processing control section 72, executing a dynamic image display control program. The dynamic image display control program is initially stored on an information storage medium 84 (see FIG. 1). The information storage medium 84 is illustrated as a floppy disk in FIG. 1, but may be formed by a CD-ROM, a memory card, or the like.

The information storage medium 84 is loaded into an information reading device (not shown) which is connected to the microcomputer. When transfer (installation) of the program from the information storage medium 84 to the image processing device 18 is instructed, the dynamic image display control program is read from the information storage medium 84 by the information reading device, and is stored in a storage device such as the HDD of the microcomputer or the like. Then, when the time to execute the dynamic image display control processing is reached, the dynamic image display control program is read from the storage device, and the program is executed by the CPU of the microcomputer. The image processing control section 72 thereby functions as the display control means of the present invention. In this way, the information storage medium 84, on which the dynamic image display control program is stored, corresponds to the recording medium of the tenth aspect.

Figure 5A:
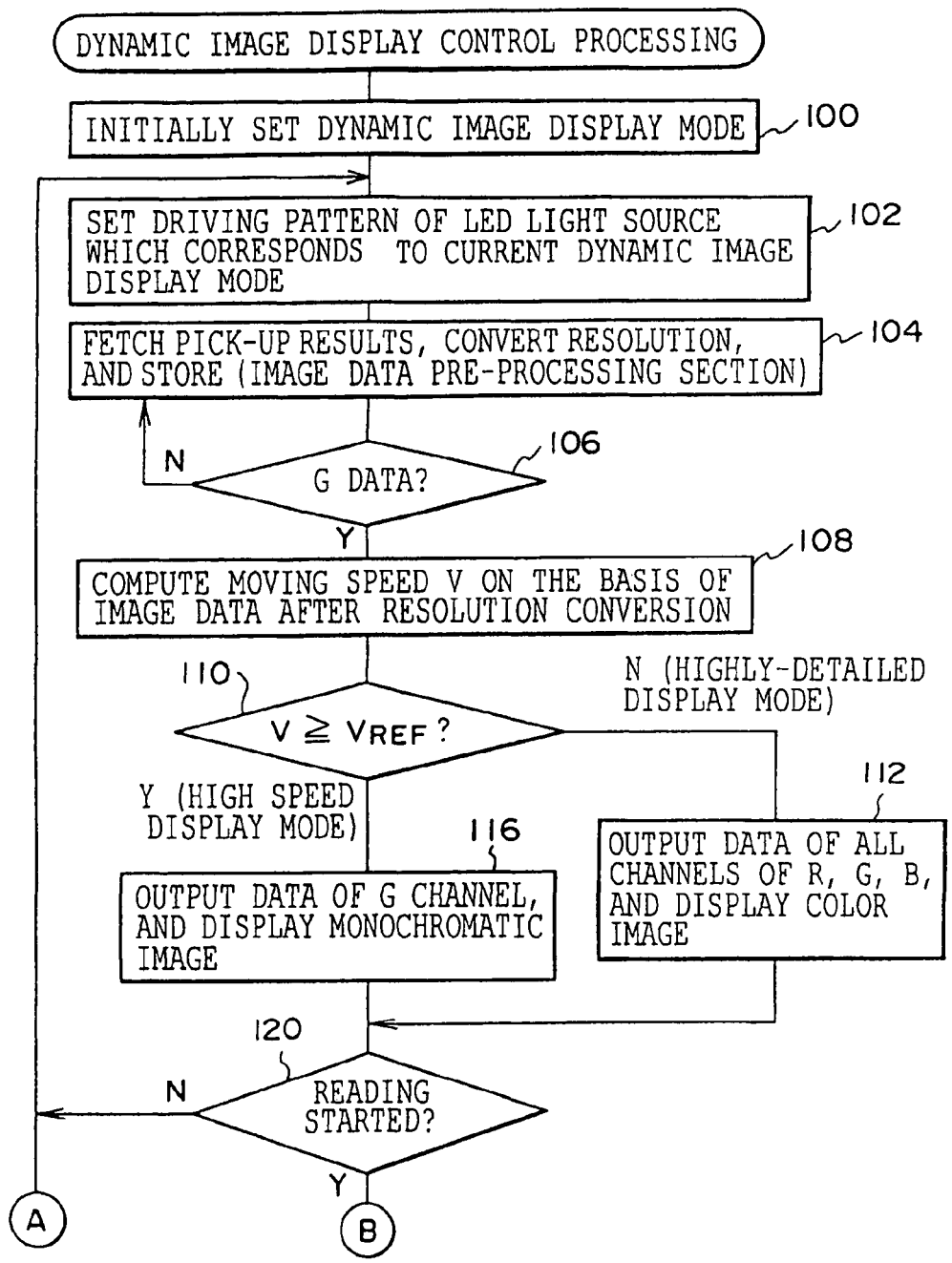
FIG. 5A is a flowchart showing the contents of dynamic image display control processing relating to a first embodiment.
Figure 5B:
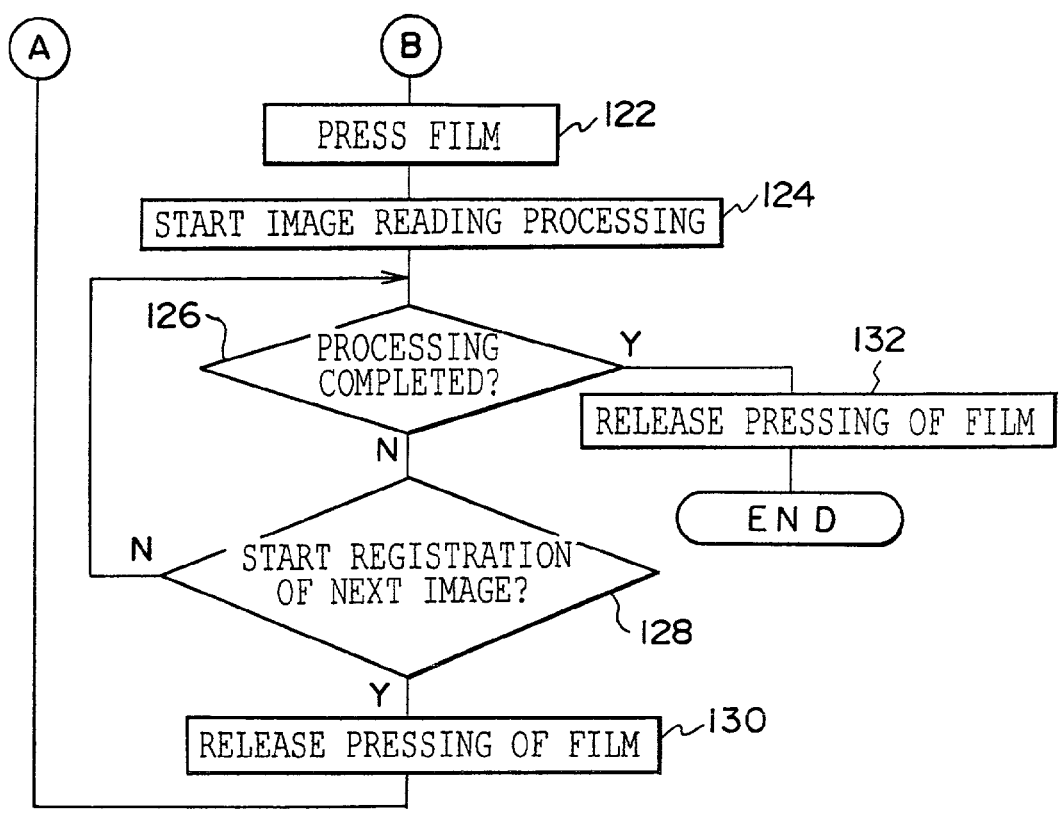
FIG. 5B is a flowchart showing the contents of dynamic image display control processing relating to a first embodiment.

As shown in FIG. 5, in step 100 of the dynamic image display control processing, initial setting of a dynamic image display mode is carried out. In the present embodiment, at the time when the image, which is the object of reading and which is recorded on the photographic film 38, is to be registered at the reading position, the state of the reading position and the periphery thereof are displayed on the CRT 20 as a dynamic image. The dynamic image display mode stipulates what type of dynamic image is to be displayed on the CRT 20. In the present embodiment, there are the following two modes: a high speed display mode in which the dynamic image can be displayed at high speed, and a highly-detailed display mode in which the dynamic image can be displayed in great detail.

The high speed display mode relating to the present first embodiment specifically is a mode which displays the dynamic image at high speed by monochromatically displaying the dynamic image on the CRT 20, and corresponds to the high speed display mode of the second aspect and the monochrome display mode of the fourth aspect. Further, the highly-detailed display mode relating to the present first embodiment specifically is a mode which displays the dynamic image in great detail by displaying the dynamic image in color on the CRT 20, and corresponds to the highly-detailed display mode of the second aspect and the color display mode of the fourth aspect. In step 100, a display mode which is fixedly prescribed in advance (the high speed display mode or the highly-detailed display mode) is set as the dynamic image display mode.

In subsequent step 102, the driving pattern (light emitting pattern) of the LED light source 34 corresponding to the current dynamic image display mode is set at the driver 36. In the present first embodiment, if the dynamic image display mode is the high speed display mode, a driving pattern which makes only G light be emitted from the LED light source 34 is set. In this case, only the image data of the G channel is inputted from the film scanner 12 at each predetermined period as the image data expressing the results of pick-up by the CCD sensor 56. Further, if the dynamic image display mode is the highly-detailed display mode, a driving pattern, by which the light emitted from the LED light source 34 switches at predetermined periods in the order of R light→G light→B light→R light→. . . , is set. In this case, image data of the respective channels of R, G, B is inputted from the film scanner 12 successively at predetermined periods as the image data which expresses the results of pick-up by the CCD sensor 56.

In subsequent step 104, when the image data expressing the results of pick-up by the CCD sensor 56 is inputted from the film scanner 12, predetermined pre-processings, which include fetching of the inputted image data and converting of the resolution of the fetched image data (lowering of the resolution in order to display, on the CRT 20 and as the dynamic image, the image which is expressed by the image data), are carried out by the image data pre-processing section 64. Thereafter, the pre-processed image data is stored in the prescan memory 66.

In step 106, it is judged whether or not the image data which is stored in the prescan memory 66 is image data of the G channel among the channels of R, G, B. If the answer to the determination is negative, the routine returns to step 104, and steps 104 and 106 are repeated. When the answer to the determination in step 106 is affirmative, the routine moves on to step 108 where, on the basis of the G channel image data which is stored in the prescan memory 66, a moving speed V of the photographic film 38, on which the image which is the object of reading is recorded, is computed.

At a time immediately after execution of the dynamic image display control processing has started, only one item of G channel image data is stored in the prescan memory 66. Thus, it is difficult to compute the moving speed V. (In this case, it suffices to set a predetermined value as the moving speed V.) In a state in which plural G channel image data (image data obtained by pick-up at respectively different times) are stored in the prescan memory 66, as one example, the difference in the densities of the pixels at the same address in the individual image data can be computed as a physical amount corresponding to the moving speed V. (The difference in the densities of a single pixel may be used, but is preferable to use the average of differences in density which are determined for respective pixels of a large number of pixels.)

In the next step 110, a determination is made as to whether the computed moving speed V (or a physical amount corresponding to the moving speed V) is greater than or equal to a reference value $V_{REF}$ (or a predetermined value corresponding to the reference value $V_{REF}$) of the moving speed. Note that step 110 corresponds to the automatic selecting means of the sixth aspect (specifically, the automatic selecting means of the seventh and eighth aspects), and step 108 corresponds to the detecting means of the seventh aspect.

If the above determination is negative, it can be judged that the photographic film is not moving, or that, if the photographic film is moving, the moving speed thereof is relatively low. Thus, the routine moves on to step 112 where the most recent image data of the respective channels of R, G, B which is stored in the prescan memory 66 is read, and is outputted to the CRT 20 via the color reproduction conversion section 76. In this way, a color image, which corresponds to the highly-detailed display mode, is displayed on the CRT 20 as an image expressing the results of pick-up by the CCD sensor 56.

On the other hand, in a case in which the answer to the judgement in step 110 is affirmative, it can be judged that the photographic film is being moved at a relatively high speed. Thus, the routine moves on to step 116 where the most recent image data of the G channel stored in the prescan memory 66 is read out, and is outputted to the CRT 20 via the color reproduction conversion section 76. In this way, a monochromatic image, which corresponds to the high speed display mode, is displayed on the CRT 20 as an image expressing the results of pick-up by the CCD sensor 56.

In subsequent step 120, on the basis of whether or not information instructing the start of reading has been inputted by the operator via the key input section 78, it is judged whether or not reading of the image which is the object of reading has been instructed. If the judgement is negative, the routine returns to step 102, and steps 102 through 120 are repeated. In this way, a dynamic image expressing the results of pick-up by the CCD sensor 56 (a color dynamic image corresponding to the highly-detailed display mode or a monochromatic dynamic image corresponding to the high speed display mode) is displayed on the CRT 20.

During this time, the operator carries out registration work for registering the image, which is the object of reading, at the reading position. Namely, in a case in which registration of the image which is the object of reading is to be carried out by using the film mask 40, at which the mask 44 for an elongated film is set and which is loaded at a given position on the work surface 32U, the operator grasps the elongated photographic film 38 on which the image which is the object of reading is recorded, and grasps the tongue plate 48B, and rotates the cover 44B upward. After the operator inserts the photographic film 38 between the base 44A and the cover 44 of the mask 44 for an elongated film, the operator moves the photographic film 38 along the longitudinal direction thereof while referring to the dynamic image displayed on the CRT 20, such that the position of the image which is the object of reading matches the reading position with high accuracy.

Further, in a case in which registration of the image which is the object of reading is to be carried out by using the film mask 40, at which the mask 50 for a mount film is set and which is loaded at a given position on the work surface 32U, the operator sets the photographic film (mount film) 38, on which the image which is the object of reading is recorded, at the film holder 50B, and loads the film holder 50B on the top surface of the base 50A. Thereafter, the operator slidingly moves the film holder 50B in an arbitrary direction on the top surface of the base 50A while referring to the dynamic image displayed on the CRT 20, such that the position of the image which is the object of reading matches the reading position with high accuracy.

Moreover, in a case in which registration of the image which is the object of reading is to be carried out by using the automatic film carrier which is set at a given position on the work surface 32U, the operator grasps the elongated photographic film 38 on which the image which is the object of reading is recorded, and inserts the photographic film 38 through a film conveying path formed within the automatic film carrier. Thereafter, the operator gives an instruction to register, at the reading position, the image which is the object of reading, by, for example, turning on a predetermined key which is provided at the keyboard 80 of the key input section 78, or the like. The instructions of the operator are transmitted to the automatic film carrier via the image processing control section 72. The automatic film carrier recognizes the frame position of the image which is the object of reading, and conveys the photographic film 38 so that the image which is the object of reading is registered at the reading position.

By referring to the dynamic image which is displayed on the CRT 20, the operator confirms the accuracy of registration, of the image which is the object of reading, by the automatic film carrier. If the operator judges that the position of the image which is the object of reading is offset from the reading position, by the operator, for example, turning on a predetermined key provided at the keyboard 80 of the key input section 78, the operator makes the photographic film 38 be moved slightly, and carries out fine correction such that the position of the image which is the object of reading matches the reading position.

In the above-described registration work, when the image, which is the object of reading and which is positioned at a position which is relatively far from the reading position, is to be registered so as to approximately coincide with the reading position, in order to complete the work quickly, it is preferable that the dynamic image displayed on the CRT 20 follow, at a relatively high speed, the changes in the state of the region within the pick-up range of the CCD sensor 56. When the image, which is the object of reading and which is positioned at a position near to the reading position, is to be registered accurately at the reading position, it is preferable that a highly-detailed dynamic image be displayed on the CRT 20 in order to accurately register the image which is the object of reading.

Figure 6:
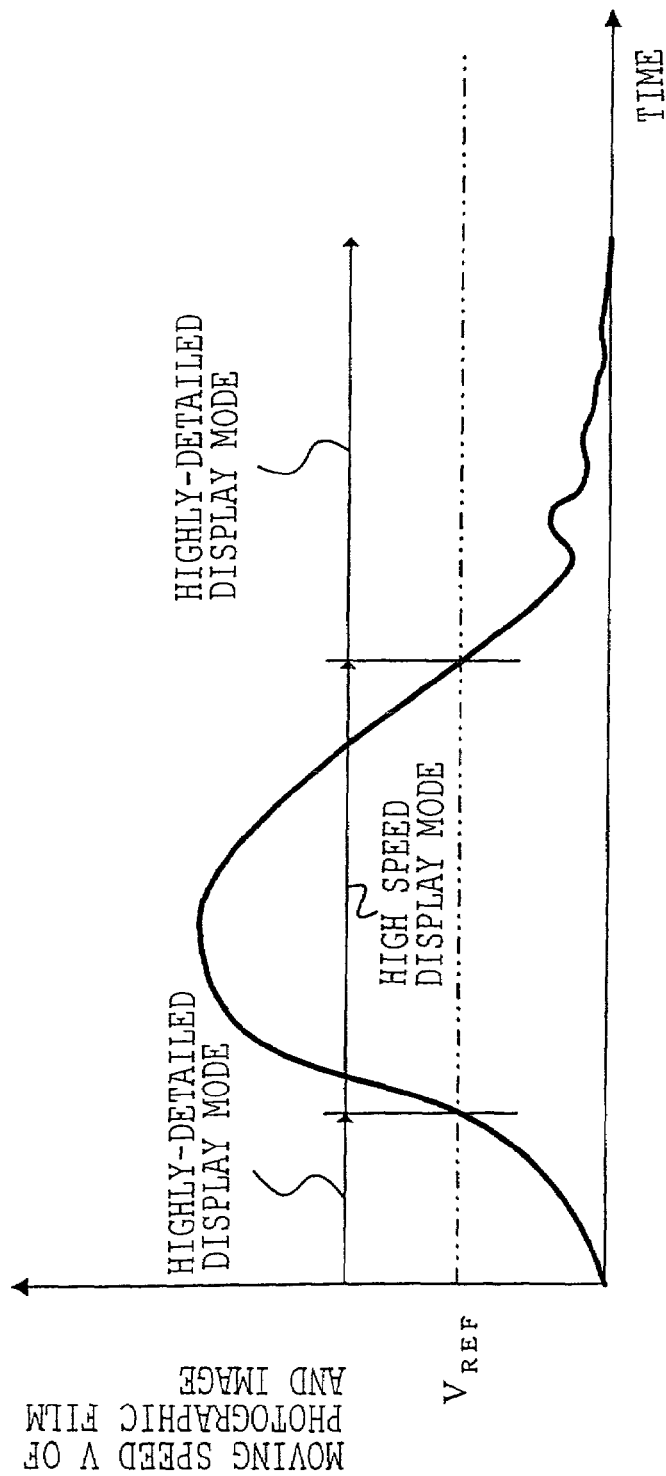
FIG. 6 is a graph showing an example of a relationship between moving speed V of a photographic film and an image which is an object of reading, and switching timing of a dynamic image display mode.

In contrast, at the time when the image which is the object of reading is to be registered so as to approximately match the reading position, the photographic film 38 is moved at a relatively high speed. Thus, in the present embodiment, as shown in FIG. 6 as well, during the time when the moving speed V is greater than or equal to the reference value $V_{REF}$, the high speed display mode is set as the dynamic image display mode.

In the high speed display mode relating to the present first embodiment, the LED light source 34 is driven such that only G light is illuminated from the LED light source 34. Thus, only image data of the G channel is inputted from the film scanner 12 at predetermined periods. Accordingly, the answer to the determination in step 106 is affirmative at predetermined periods. Thus, at the CRT 20, the display is switched at relatively short periods (=predetermined periods), and a monochromatic dynamic image, which follows at high speed the changes in the state of the region within the pick-up range, is displayed. Accordingly, while referring to the monochromatic dynamic image which is displayed on the CRT 20 and whose display is being switched at high speed, the operator carries out registration so that the image which is the object of reading approximately coincides with the reading position. Work can thereby be carried out quickly.

Further, when the image which is the object of reading is to be registered accurately at the reading position, the moving speed of the photographic film 38 is relatively low speed. Thus, in the present embodiment, as shown in FIG. 6 as well, during the time when the moving speed V is less than the reference value $V_{REF}$, the highly-detailed display mode is set as the dynamic image display mode.

In the highly-detailed display mode relating to the present first embodiment, the LED light source 34 is driven such that the light emitted from the LED light source 34 switches at predetermined periods in the order of R light→G light→B light→R light→. . . . Thus, image data of the respective channels of R, G, B is inputted at predetermined periods in order from the film scanner 12. Accordingly, the determination in step 106 is affirmative at a period which is three times the predetermined period. Thus, the display switching period of the dynamic image displayed on the CRT 20 becomes relatively long (=the predetermined period×3). By outputting the data of all of the channels of R, G, B, a highly-detailed color dynamic image is displayed on the CRT 20. Accordingly, while referring to the highly-detailed, color dynamic image which is displayed on the CRT 20, the operator carries out registration, at the reading position, of the image which is the object of reading. The image which is the object of reading can thereby be registered accurately at the reading position.

FIG. 6 shows the progress of the moving speed V of the photographic film 38 and the image which is the object of reading, at the time when a single image which is the object of reading is registered at the reading position. As is clear from FIG. 6 as well, during the period of time from the start of registering, at the reading position, the image which is the object of reading to completion of the registration, the dynamic image display mode is changed appropriately in accordance with changes in the moving speed V. Thus, by the operator referring to the dynamic image which is displayed on the CRT 20, the operator can quickly and accurately carry out registering, at the reading position, of the image which is the object of reading.

When the registration, at the reading position, of the image which is the object of reading is completed, the operator instructs, via the key input section 78, execution of image reading. In this way, the answer to the determination in step 120 is affirmative, and the routine moves on to step 122. In a case in which the film mask 40 at which the mask 44 for an elongated film is set is loaded on the work surface 32U, by energizing the solenoid 46, the photographic film 38 on which the image which is the object of reading is recorded is pressed. Note that, also in a case in which a solenoid, which is similar to the solenoid 46, is provided at the automatic film carrier and the automatic film carrier is loaded on the work surface 32U, the photographic film 38 is pressed by this solenoid being energized.

In subsequent step 124, image reading processing is started. This image reading processing also is a processing which is realized by a predetermined program being executed by a microcomputer which functions both as the first image processing section 70 and the image processing control section 72. As described previously, the series of the following processings is carried out: prescanning of the image which is the object of reading which has been registered at the reading position; on the basis of the low resolution image data obtained by prescanning, determining the reading conditions for fine scanning; reporting the determined reading conditions to the film scanner 12; determining (set-up computing) the processing conditions for image processing of the high resolution image data obtained by fine scanning; reporting the determined processing conditions to the first image processing section 70; carrying out image processing (at the first image processing section 70) on the low resolution image data under the determined processing conditions; displaying the results of image processing (the simulation image) on the CRT 20; and the like.

This image reading processing may include processings such as fine scanning the image registered at the reading position, carrying out (at the second image processing section 74) image processing under the determined processing conditions on the high resolution image data obtained by the fine scanning, outputting the results of image processing, and the like.

During this time, in the dynamic image display control processing, in step 126, a determination is made as to whether completion of reading of the image recorded on the photographic film 38 has been instructed or not. If the answer to the determination is negative, the routine moves on to step 128, where a determination is made as to whether to start registration of the image which is recorded on the photographic film 38 and which is next after the image which is registered at the reading position. If the answer to the determination in step 128 is negative, the routine returns to step 126, and steps 126 and 128 are repeated.

When the determination in step 128 is affirmative due to the image reading processing of the image which is registered at the reading position being completed, the routine proceeds to step 130 where the pressing of the photographic film 38 is released (in a case the film mask 40 at which the mask 44 for an elongated film is set, or the automatic film carrier, is loaded on the work surface 32U). When the processing of step 130 is carried out, the routine returns to step 102, and the processings from step 102 on are repeated. In this way, all of the images which are objects of reading and which are recorded on the photographic film 38 can be successively registered at the reading position quickly and accurately.

When reading of all of the images which are objects of reading and which are recorded on the photographic film 38 which is set at the film mask 40 (or at the automatic film carrier) is completed, the answer to the determination of step 126 is affirmative, and the routine moves on to step 132. After the pressing of the photographic film 38 is released (in a case the film mask 40 at which the mask 44 for an elongated film is set, or the automatic film carrier, is loaded on the work surface 32U), the dynamic image display control processing is completed.

SECOND EMBODIMENT

Figure 7A:
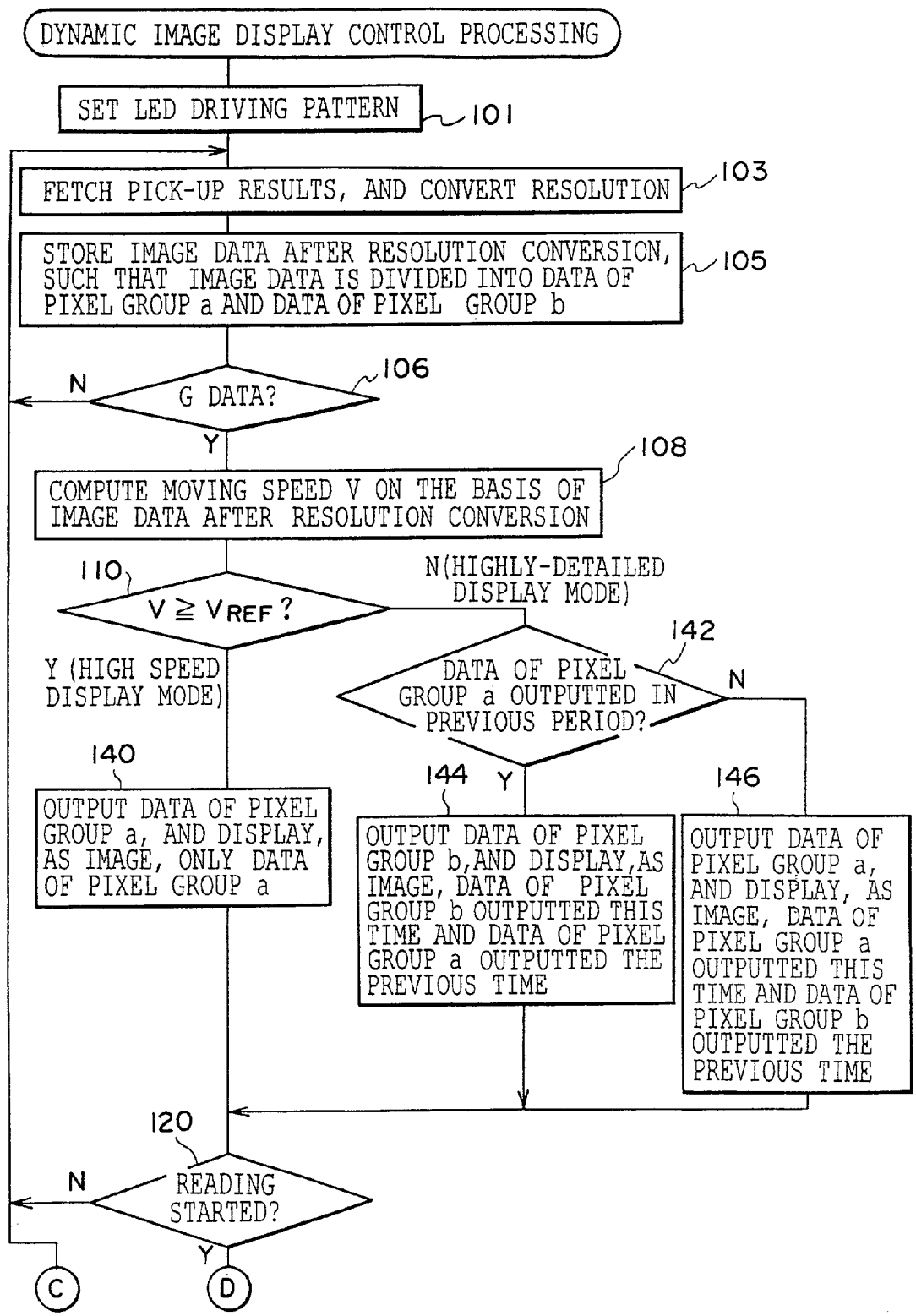
FIG. 7A is a flowchart showing contents of dynamic image display control processing relating to a second embodiment.
Figure 7B:
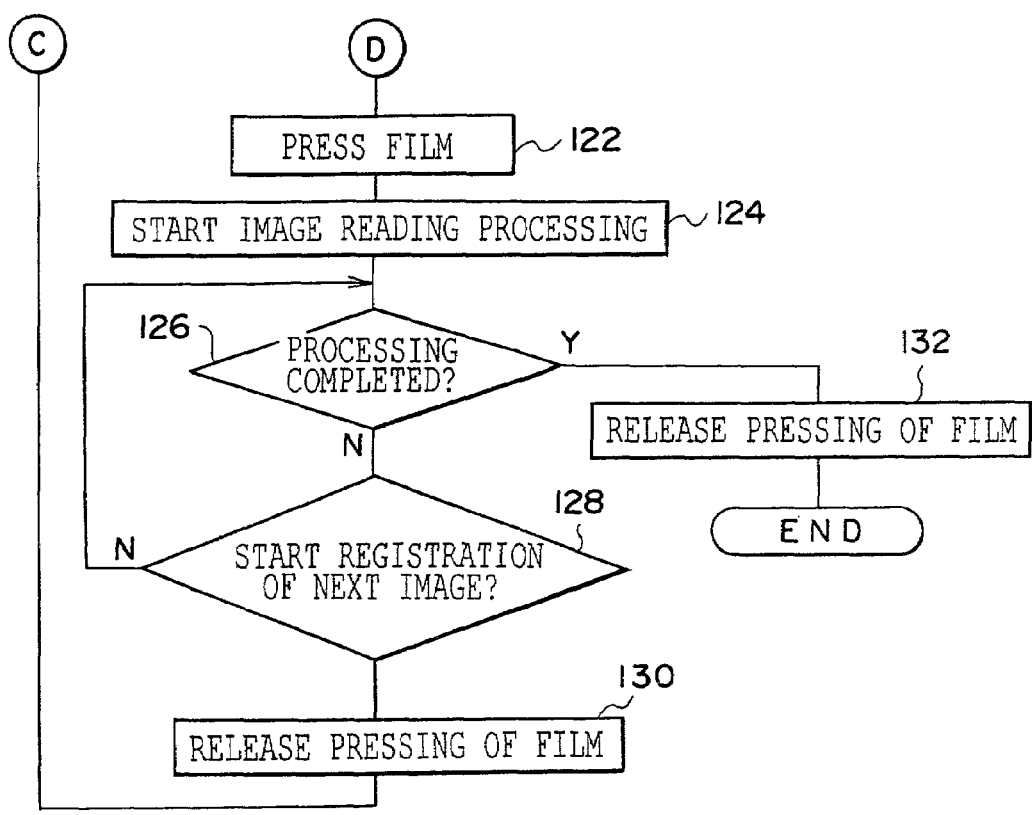
FIG. 7B is a flowchart showing contents of dynamic image display control processing relating to a second embodiment.

Next, a second embodiment of the present invention will be described. Because the second embodiment has the same structure as the first embodiment, the same reference numerals are used for the respective portions, and description of the structure is omitted. Hereinafter, with reference to FIG. 7, explanation will be given only of portions of the dynamic image display control of the present second embodiment which differ from the dynamic image display control processing described in the first embodiment.

In the present second embodiment, in the high speed display mode and the highly-detailed display mode, color dynamic images of resolutions which differ from one another are displayed on the CRT 20. Thus, in step 101, a driving pattern in which the light emitted from the LED light source 34 switches at predetermined periods in the order of R light→G light→B light→R light→. . . is fixedly set by the driver 36 as the driving pattern of the LED light source 34.

Figure 8A:
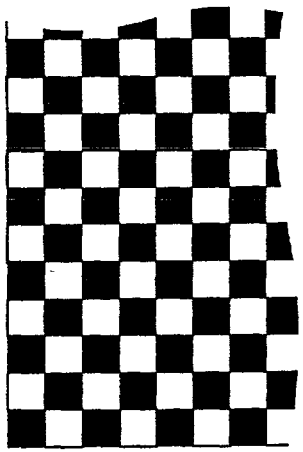
FIG. 8A is an image diagram showing an example of a distribution of pixel group a and pixel group b.

In subsequent step 103, when image data, which expresses the results of pick-up by the CCD sensor 56, is inputted from the film scanner 12, by the image data pre-processing section 64, the inputted image data is fetched, and predetermined pre-processings including conversion of the resolution of the fetched image data (lowering of the resolution for displaying the image expressed by the image data as a dynamic image on the CRT 20) are carried out. Then, in step 105, the image data after the resolution conversion is separated into data of a pixel group a and data of a pixel group b, and is stored in the prescan memory 66. In the pixel group a and the pixel group b, the positions, on the image, of the pixels forming the respective pixel groups are determined, as shown in FIG. 8A for example, such that the pixels forming the respective pixel groups have a substantially uniform distribution on the image.

The next steps 106 through 110 are the same as those of the dynamic image display control processing relating to the first embodiment. However, in a case in which the determination in step 110 is affirmative (in a case in which the moving speed V of the photographic film is greater than or equal to the reference value $V_{REF}$), it is judged that the dynamic image is to be displayed in the high speed display mode. The routine moves on to step 140 where only the most recent data of pixel group a stored in the prescan memory 66 is read (the data of pixel group b rather than pixel group a may be read), and is outputted to the CRT 20 via the color reproduction conversion section 76. A color image corresponding to the high speed display mode is thereby displayed on the CRT 20 (see FIG. 8B).

As described above, in the high speed display mode relating to the present second embodiment, an image (dynamic image) is displayed by using only the data of pixel group a. Thus, as compared with a case in which an image (dynamic image) is displayed by using the data of pixel group a and pixel group b, the resolution of the dynamic image displayed on the CRT 20 is lowered by ½, but the display is updated at a period which is the same as the period at which the judgement in step 106 is affirmative (the period at which the image data of the respective channels of R, G, B is inputted from the film scanner 12). Thus, the changes of the state of the region within the pick-up range of the CCD sensor 56 can be followed at a relatively high speed.

Accordingly, by referring to the dynamic image displayed on the CRT 20, the operator can quickly carry out work such as registering the image which is the object of reading to approximately match the reading position. Note that the high speed display mode relating to the present second embodiment corresponds to the high speed display mode of the second aspect (specifically, the high speed display mode of the third aspect).

On the other hand, in a case in which the answer to the determination in step 110 is negative (the moving speed V of the photographic film is less than the reference value $V_{REF}$), it is judged that the dynamic image is to be displayed in the highly-detailed display mode, and the routine moves to step 142. In step 142, it is judged whether the data of pixel group a was outputted in the previous period. If the answer to the judgement in step 142 is affirmative, the routine moves on to step 144 where control is carried out such that the most recent data of pixel group b stored in the prescan memory 66 is read and is outputted to the CRT 20 via the color reproduction conversion section 76, and, by using the data of pixel group b which is outputted this period and the data of pixel group a which was outputted the previous period, a single, color image corresponding to the highly-detailed mode is displayed on the CRT 20 (see FIG. 8B as well).

Figure 8B:
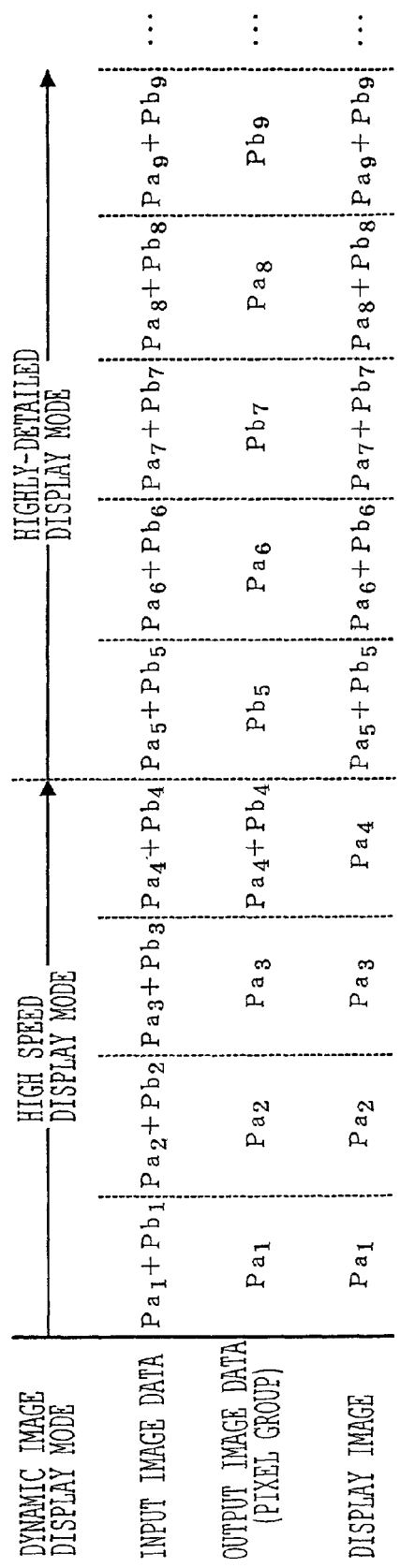
FIG. 8B is a schematic diagram showing an example of changes in output image data and a displayed image, which changes accompany switching of the dynamic image display mode.

Further, in a case in which the answer to the determination in step 142 is negative (the data of pixel group b was outputted in the previous period), the routine moves on to step 146 where control is carried out such that the most recent data of pixel group a stored in the prescan memory 66 is read and is outputted to the CRT 20 via the color reproduction conversion section 76, and, by using the data of pixel group a which is outputted this period and the data of pixel group b which was outputted the previous period, a single, color image corresponding to the highly-detailed mode is displayed on the CRT 20 (see FIG. 8B as well).

As described above, in the highly-detailed display mode relating to the present second embodiment, an image (dynamic image) is displayed by using the data of pixel group a and the data of pixel group b. Thus, as is clear from FIG. 8B as well, the period at which the display is updated is substantially twice the period at which the determination of step 106 is affirmative (the period at which the image data of the respective channels of R, G, B are inputted from the film carrier 12). As compared with a case (the high speed display mode) in which an image (dynamic image) is displayed by using only the data of pixel group a or pixel group b, the speed of following the changes in the state of the region within the pick-up range of the CCD sensor 56 is lowered, but the resolution of the dynamic image displayed on the CRT 20 is two times greater.

Accordingly, by referring to the dynamic image displayed on the CRT 20, the operator can accurately register, at the reading position, the image which is the object of reading. Note that the highly-detailed display mode relating to the present second embodiment corresponds to the highly-detailed display mode of the second aspect (specifically, the highly-detailed display mode of the third aspect).

In the second embodiment, as an example, a case is described in which color dynamic images are displayed in both the high speed display mode and the highly-detailed display mode. However, the present invention is not limited to the same, and monochromatic dynamic images may be displayed in each of the high speed display mode and the highly-detailed display mode.

Further, in the above explanation, the shortening of the period of updating the dynamic image in the high speed display mode is realized by lowering the resolution of the displayed dynamic image. However, the present invention is not limited to the same. By decreasing the number of gradations of the displayed dynamic image (reducing the amount of data per pixel), a shortening of the period of updating the dynamic image in the high speed display mode can be realized.

Further, in the above, the moving speed V of the photographic film 38 (the state of movement of the original) is detected on the basis of the results of pick-up by the CCD sensor 56 . However, the present invention is not limited to the same. For example, the moving speed V can be detected by optically detecting perforations formed in the photographic film 38. Or, the moving speed V may be detected by detecting, by a sensor, the rotation of a member (e.g. , a roller or a ball or the like) which rotates in accordance with the movement of the photographic film 38.

In the above description, the dynamic image display mode is automatically selected in accordance with the moving speed V of the photographic film 38 and the image which is the object of reading. However, the present invention is not limited to the same. The dynamic image display mode may be selected automatically by also considering an image characteristic amount (e.g., the density or contrast or the like) of the image which is the object of reading which is positioned within the pick-up range. For example, it is difficult to ascertain the positions of the edges of an image which has low density or contrast overall, and registration at the reading position of such an image is not easy. Thus, in a case in which it is sensed, on the basis of the results of pick-up by the pick-up sensor, that the image which is the object of reading is such an image, the dynamic image display mode may be switched in order to display a more detailed dynamic image.

In the above, a case is described in which the dynamic image display mode is automatically selected in accordance with the moving speed V of the photographic film 38 and the image which is the object of reading. However, the present invention is not limited to the same. The dynamic image display mode may be switched in accordance with an instruction to switch the dynamic image display mode which is inputted by the operator via the key input section 78. The key input section 78 in this function corresponds to the manual selecting means of the fifth aspect.

Further, in the above description, the photographic film 38 is used as an example of the original on which the image which is the object of reading is recorded. However, the present invention is not limited to the same, and another transmission-type original such as an OHP sheet or the like, or a reflection-type original such as regular paper or the like, may be used.

Moreover, a case is described above in which the present invention is applied to the registering of an image for reading by the film scanner 12. However, the present invention is not limited to the same, and may be applied to, for example, registration of an image for printing an image recorded on a photographic film onto a photographic printing paper.

As described above, in the invention of the first aspect, at the time when an image recorded on an original is to be registered at a predetermined position, the region within a predetermined pick-up range is picked up by a pick-up sensor. The results of pick-up by the pick-up sensor are displayed by a display means in accordance with a dynamic image display mode which is selected from a plurality of dynamic image display modes which are readied in advance for displaying the results of pick-up as a dynamic image. Thus, an excellent effect is achieved in that the dynamic image which is used in registering an image can be displayed such that the image can be accurately and quickly registered at a predetermined position.

In the invention of the fifth aspect, in the invention of the first aspect, a manual selecting means for manually selecting the dynamic image display mode which is used in displaying the results of pick-up by the pick-up sensor, is provided. Thus, in addition to the above-described effect, there is the effect that the operator or the like, who carries out the work for registering the image, can arbitrarily select the optimal dynamic image display mode in accordance with the state of registering the image or the characteristics of the image which is the object of registration.

In the invention of the sixth aspect, in the invention of the first aspect, the dynamic image display mode, which is used in displaying the results of pick-up by the pick-up sensor, is automatically selected by the automatic selecting means in accordance with the moving state of the original. Thus, in addition to the above-described effect, there is the effect that the burden on the operator or the like who carries out the work for registering the image can be reduced.

In the invention of the seventh aspect, in the invention of the sixth aspect, the moving state of the original is ascertained on the basis of the results of detecting the moving state of the original by carrying out a predetermined computation by using the results of pick-up by the pick-up sensor. Thus, in addition to the above-described effect, there is the effect that the moving state of the original can be detected without providing a special sensor for detecting the moving state of the original.

In the invention of the eighth aspect, in the invention of the sixth aspect, if the moving speed of the original is greater than or equal to a predetermined value, the high speed display mode or the monochrome display mode is selected as the dynamic image display mode which is used in displaying the results of pick-up. If the moving speed of the original is less than the predetermined value, the highly-detailed display mode or the color display mode is selected as the dynamic image display mode. Thus, in addition to the above-described effect, there is the effect that a dynamic image which is used in registering an image can be automatically displayed such that the image can be accurately and quickly registered at a predetermined position.

In the invention of the ninth aspect, at the time when an image which is recorded on an original is registered at a predetermined position, a dynamic image display mode, which corresponds to the moving state of the original, is selected from among a plurality of types of dynamic image display modes. The results of pick-up of the pick-up sensor are displayed as a dynamic image on the display means in accordance with the selected dynamic image display mode. Thus, an excellent effect is achieved in that a dynamic image which is used in registering an image can be displayed such that the image can be accurately and quickly registered at the predetermined position.

In the invention of the tenth aspect, recorded on a recording medium is a program for executing, at a computer, a processing including a first step of, at the time when an image which is recorded on an original is registered at a predetermined position, selecting, from among plural types of dynamic image display modes, a dynamic image display mode which corresponds to the moving state of the original, and a second step of displaying the results of pick-up of the pick-up sensor as a dynamic image on a display means in accordance with the selected dynamic image display mode. Thus, an excellent effect is achieved in that a dynamic image, which is used in registering an image, can be displayed such that the image is accurately and quickly registered at a predetermined position.

What is claimed is:

1. An image position confirming device comprising:
    a pick-up sensor which picks-up a region within a predetermined pick-up range including
        an image reading position at which an image, which is recorded on an original medium, is to be registered in order to read the image, and
        a peripheral region of the image reading position, the peripheral region surrounding the image reading position;
    a display section for displaying the region including the image reading position and the peripheral region; and
    a display control section for, when the image recorded on the original medium is to be registered at the image reading position in order to read the image, displaying, as a dynamic image, on the display section images which are obtained by the pick-up sensor picking up the region including the image reading position and the peripheral region,
    wherein, when the image recorded on the original medium is being moved, by moving the original medium, to the image reading position at which the image is to be registered,
        a moving state of the original medium is detected, and a dynamic image display mode is selected based on the detected moving state of the original medium, the dynamic image display mode being selected from among a plurality of dynamic image display modes which are stored in advance, and
        the dynamic image is displayed on the display section in accordance with the selected dynamic image display mode.

2. An image position confirming device according to claim 1, wherein the plurality of dynamic image display modes include
    a high speed display mode which displays the picked-up image as a dynamic image which follows, at high speed, changes in a state of the region within the predetermined pick-up range, and
    a highly-detailed display mode which displays the results of the pick-up as a dynamic image which shows in great detail a state of the region within the predetermined pick-up range.

3. An image position confirming device according to claim 2, wherein
    the pick-up sensor outputs the results of the pick-up at a predetermined period, the high speed display mode is a display mode which displays the results of the pick-up as a dynamic image by displaying an image, in data expressing the picked-up image, only data of one pixel group among a first pixel group or a second pixel group which are determined such that pixels forming each pixel group are substantially uniformly distributed in the region within the pick-up range, and by updating display of the image at the predetermined period, and
    the highly-detailed display mode is a display mode which displays the results of the pick-up as a dynamic image by displaying the image by using both the data of the first pixel group and the data of the second pixel group, and by alternately updating, at the predetermined period, between display corresponding to the first pixel group and display corresponding to the second pixel group.

4. An image position confirming device according to claim 1, wherein the plurality of dynamic image display modes include a monochrome display mode which displays the picked-up image as a monochromatic dynamic image, and a color display mode which displays the picked-up image as a color dynamic image.

5. An image position confirming device according to claim 1, further comprising a manual selecting section for manually selecting the dynamic image display mode used in display of the picked-up image.

6. An image position confirming device according to claim 1, further comprising an automatic selecting section for, in accordance with the detected moving state of the original medium, automatically selecting the dynamic image display mode used in display of the results of pick-up by the pick-up sensor.

7. An image position confirming device according to claim 6, further comprising a detecting section for detecting the moving state of the original medium by carrying out a predetermined computation by using the picked-up image,
   wherein the automatic selecting section recognizes the moving state of the original medium on the basis of results of detection by the detecting section.

8. An image position confirming device according to claim 6, wherein
   when the moving state of the original medium is a state in which a moving speed of the original medium is greater than or equal to a predetermined value, the automatic selecting section selects, as the dynamic image display mode used in display of the results of the pick-up, a high speed display mode which displays the picked-up image as a dynamic image which follows, at high speed, changes in a state of the region within the pick-up range, or a monochrome display mode which displays the picked-up image as a monochromatic dynamic image, and
   when the moving speed of the original medium is less than the predetermined value, the automatic selecting section selects, as the dynamic image display mode used in display of the results of the pick-up, a highly-detailed display mode which displays the picked-up image as a dynamic image showing in great detail a state of the region within the pick-up range, or a color display mode which displays the picked-up image as a color dynamic image.

9. A method of supporting image position confirmation, comprising the steps of:
   providing a pick-up sensor which picks-up a region within a predetermined pick-up range including an image reading position at which an image, which is recorded on an original medium, is to be registered in order to read an image and a peripheral region of the image reading position, the peripheral region surrounding the image reading position;
   when the image recorded on the original medium is to be registered at the image reading position, selecting a dynamic image display mode which corresponds to a moving state of the original medium, from among a plurality of dynamic image display modes which are stored in advance; and
   displaying, as a dynamic image, on a display section for displaying images which are obtained by the pick-up sensor picking up the region including the image reading position and the peripheral region,
   wherein, when the image recorded on the original medium is being moved, by moving the original medium, to the image reading position at which the image is to be registered,
      a moving state of the original medium is detected, and a dynamic image display mode is selected based on the detected moving state of the original medium, the dynamic image display mode being selected from among the plurality of dynamic image display modes which are stored in advance, and
      the dynamic image is displayed on the display section in accordance with the selected dynamic image display mode.

10. A computer-readable medium encoded with a computer program for executing a predetermined processing at a computer which displays, on a display section for display of an image, results of a pick-up which are obtained by a pick-up sensor, which picks-up a region within a predetermined pick-up range including an image reading position at which an image, which is recorded on an original medium, is to be registered in order to read the image and a peripheral region surrounding the image reading position, picking up the region within the region including the image reading position and the peripheral region, wherein the predetermined processing includes:
   a first step of, when the image recorded on the original is to be registered at the image reading position, selecting a dynamic image display mode which corresponds to a moving state of the original, from among a plurality of dynamic image display modes which are stored in advance; and
   a second step of displaying, as a dynamic image, on the display section, images which are obtained by the pick-up sensor picking up the region including the image reading position and the peripheral region,
   wherein, when the image recorded on the original medium is being moved, by moving the original medium, to the image reading position at which the image is to be registered,
      a moving state of the original medium is detected, and a dynamic image display mode is selected based on the detected moving state of the original medium, the dynamic image display mode being selected from among the plurality of dynamic image display modes which are stored in advance, and
      the dynamic image is displayed on the display section in accordance with the selected dynamic image display mode.

11. An image position confirming device according to claim 3, wherein each pixel of the first pixel group is arranged in a first predetermined interval and each pixel of the second pixel group is arranged in a second predetermined interval.

12. An image position confirming device according to claim 11, wherein each pixel of the first pixel group and each pixel of the second pixel group are arranged alternately.

13. A method of supporting image position confirmation according to claim 9, wherein the plurality of dynamic image display modes include a high speed display mode which displays the results of the pick-up as a dynamic image which follows, at high speed, changes in a state of the region within the predetermined pick-up range, and a highly-detailed display mode which displays the picked-up image as a dynamic image which shows in great detail a state of the region within the predetermined pick-up range.

14. A method of supporting image position confirmation according to claim 13, wherein
   the pick-up sensor outputs the picked-up image at a predetermined period,
   the high speed display mode is a display mode which displays the picked-up as a dynamic image by displaying an image which shows only data of a first pixel group or a second pixel group but not both, wherein both pixel groups are substantially uniformly distributed in the region within the pick-up range, and by updating display of the image at the predetermined period, and
   the highly-detailed display mode is a display mode which displays the results of the pick-up as a dynamic image by displaying the image by using both data of the first pixel group and data of the second pixel group, and by alternately updating, at the predetermined period, between display corresponding to the first pixel group and display corresponding to the second pixel group.

15. A method of supporting image position confirmation according to claim 9, wherein the plurality of dynamic image display modes include a monochrome display mode which displays the picked-up image as a monochromatic dynamic image, and a color display mode which displays the picked-up image as a color dynamic image.

16. A method of supporting image position confirmation according to claim 9, wherein the moving state of the original medium is detected by carrying out a predetermined computation by using the results of the pick-up by the pick-up sensor, and on the basis of the detected moving state, the dynamic image display mode is selected, from among the plurality of dynamic image display modes.

17. A method of supporting image position confirmation according to claim 9, wherein when the moving state of the original medium is a state in which a moving speed of the original medium is greater than or equal to a predetermined value, as the dynamic image display mode used in display of the picked-up image, a high speed display mode which displays the results of the pick-up as a dynamic image which follows, at high speed, changes in a state of the region within the pick-up range, or a monochrome display mode which displays the picked-up image as a monochromatic dynamic image, is selected, and when the moving speed of the original medium is a state in which the moving speed is less than the predetermined value, as the dynamic image display mode used in display of the picked-up image, a highly-detailed display mode which displays the picked-up image as a dynamic image showing in great detail a state of the region within the pick-up range, or a color display mode which displays the picked-up image as a color dynamic image, is selected.

18. An image position confirming device according to claim 1, wherein the display control section is configured to change the dynamic display mode based on the detected moving state of the original medium while the original medium is being moved to the image reading position at which the image is to be registered.

19. An image position confirming device according to claim 2, wherein, when the image recorded on the original medium is being moved and registered, by moving the original medium, to the image reading position, the dynamic image display mode is changed from the high speed display mode to the highly-detailed display mode based on the judged moving state of the original medium.

* * * * *